United States Patent [19]

Mracek et al.

[11] 3,988,790

[45] Nov. 2, 1976

[54] PORTABLE SUPPORT FOR A BED PATIENT

[76] Inventors: Milo F. Mracek, 22 Morwood Lane, Creve Coeur, Mo. 63141; Ronald J. Bauer, 1935E Monfort, Florissant, Mo. 63033

[22] Filed: Feb. 12, 1975

[21] Appl. No.: 551,846

Related U.S. Application Data

[62] Division of Ser. No. 420,083, Nov. 29, 1973, Pat. No. 3,876,018, which is a division of Ser. No. 214,806, Jan. 3, 1972, Pat. No. 3,795,284.

[52] U.S. Cl. .......................................... 5/86; 5/89
[51] Int. Cl.² .......................................... A61G 7/10
[58] Field of Search ............ 280/150.5, 150 C; 5/63, 5/81, 86, 89, 67, 68, 81 R; 312/276

[56] References Cited
UNITED STATES PATENTS

| | | | |
|---|---|---|---|
| 2,545,813 | 3/1951 | Jackson | 5/155 |
| 3,150,904 | 9/1964 | Kemdt et al. | 312/276 |
| 3,452,371 | 7/1969 | Hirsch | 5/81 B |

*Primary Examiner*—Paul R. Gilliam
*Assistant Examiner*—Andrew M. Calvert
*Attorney, Agent, or Firm*—Rogers, Eilers & Howell

[57] ABSTRACT

A normally-deflated, readily-flexible, inflatable pad which underlies a bed patient can be inflated to raise that bed patient and to gently but firmly hold that bed patient in raised position. When that inflatable pad is inflated, it defines a recess at the lower surface of the center thereof into which the supporting surface of a portable support can be moved; and that inflatable pad and that portable support can thereafter hold the bed patient at a desired level relative to the bed on which that inflatable bed normally rests. When the supporting surface of the portable support subsequently is removed from the recess at the lower surface of the center of the inflatable bed, that inflatable pad can be deflated to lower the bed patient. A pressure transducer, between the supporting surface and the carrier therefor, develops a signal while that supporting surface underlies and holds the inflatable pad and the bed patient; and a readout responds to that signal to indicate the weight of that bed patient.

14 Claims, 30 Drawing Figures

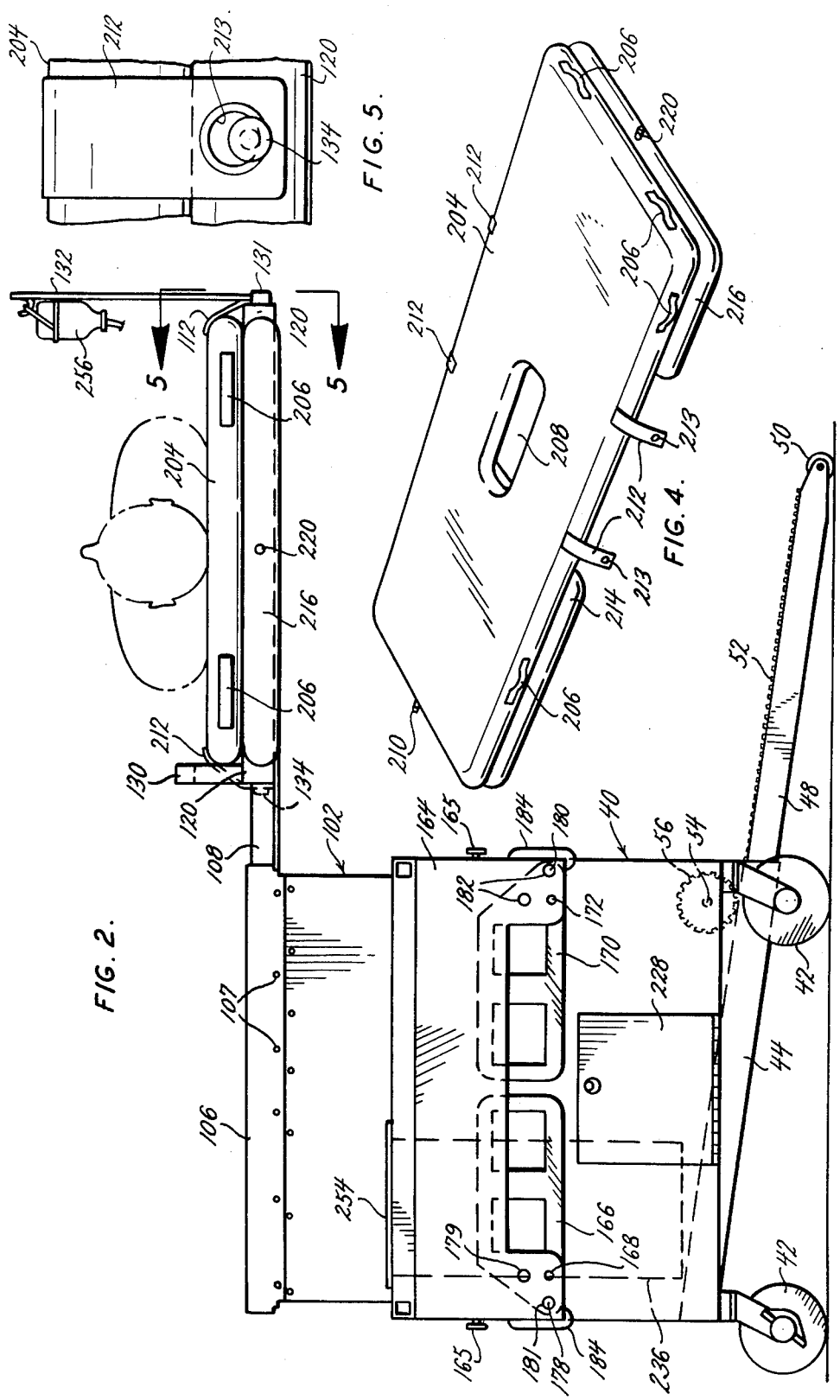

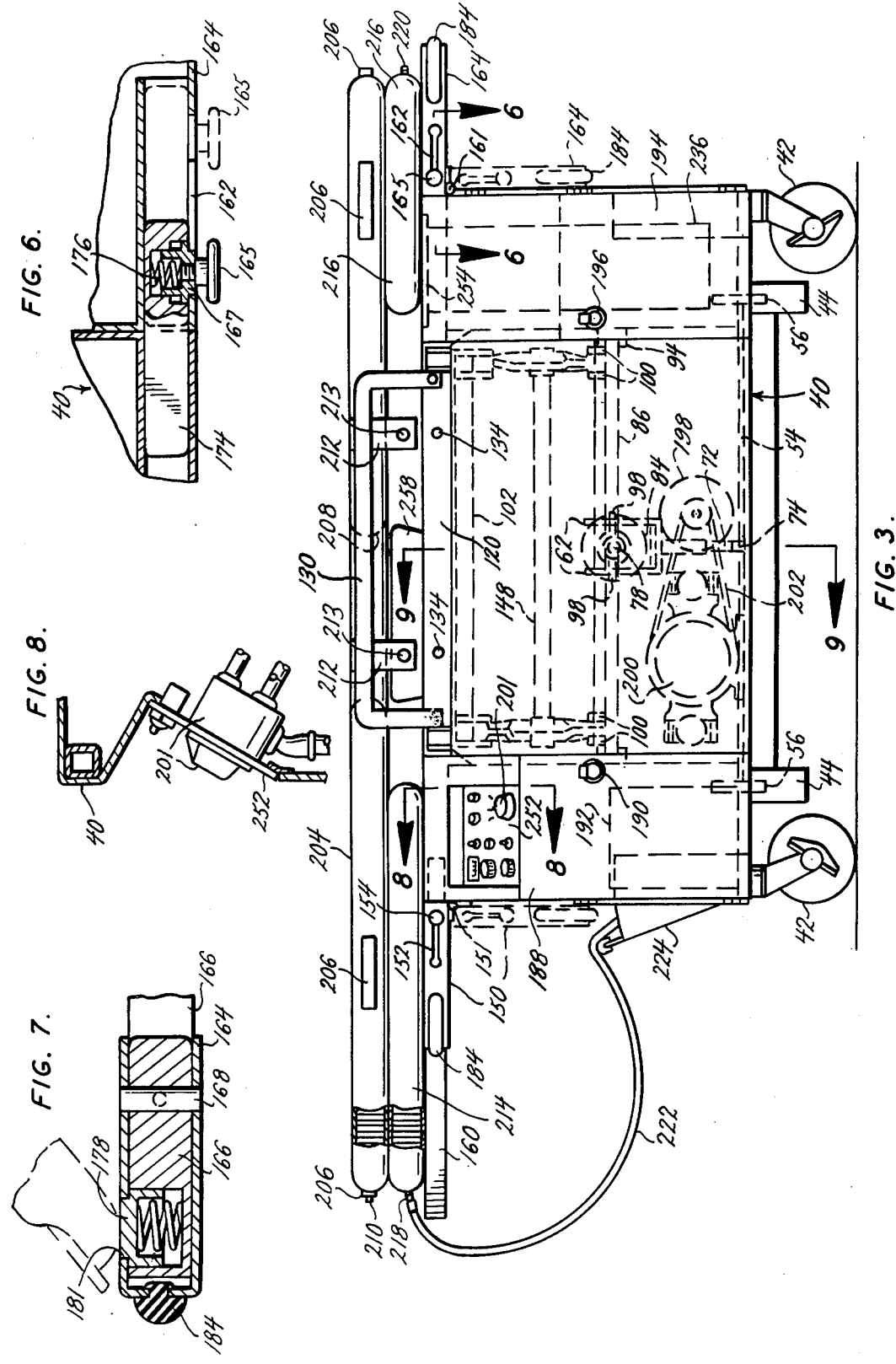

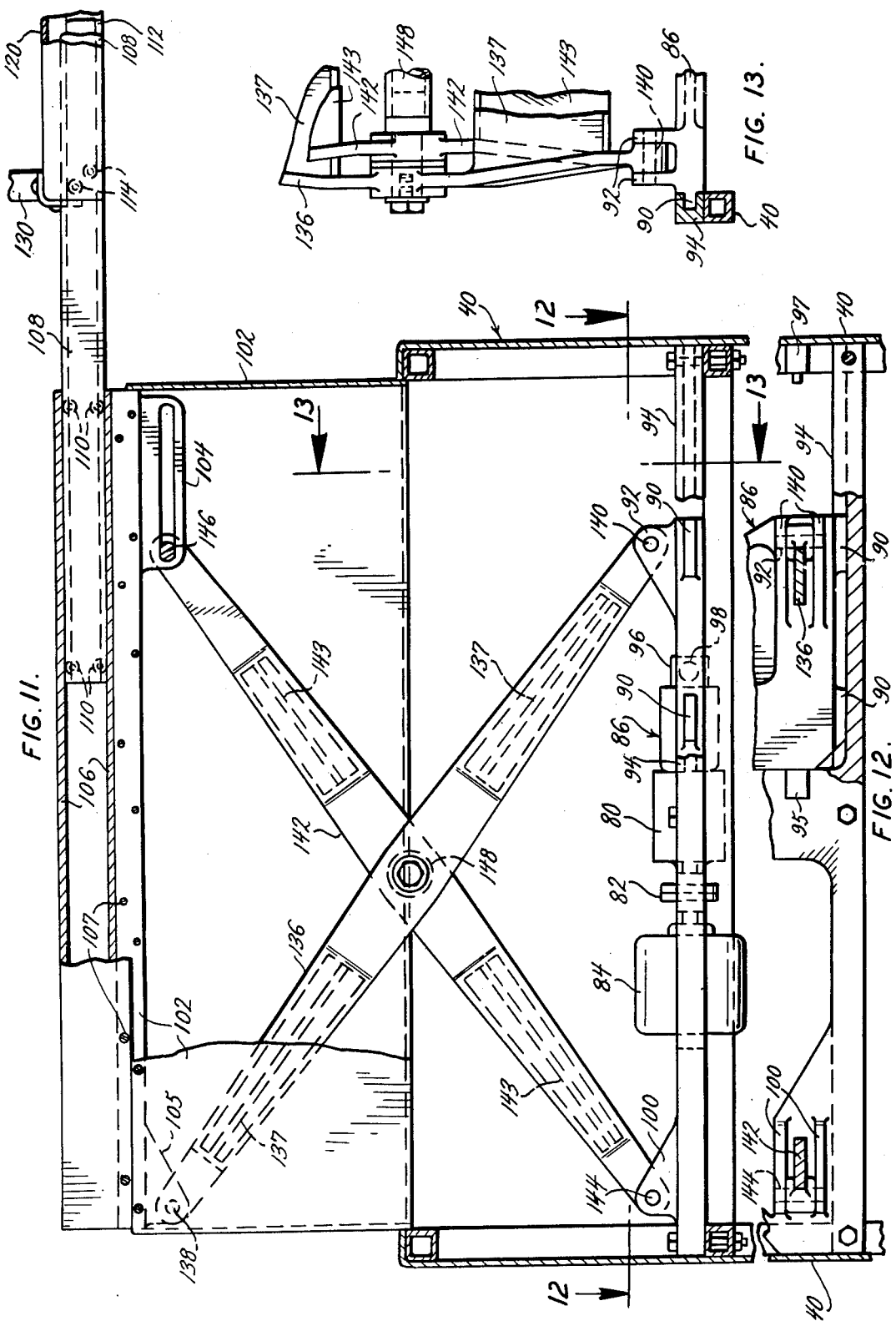

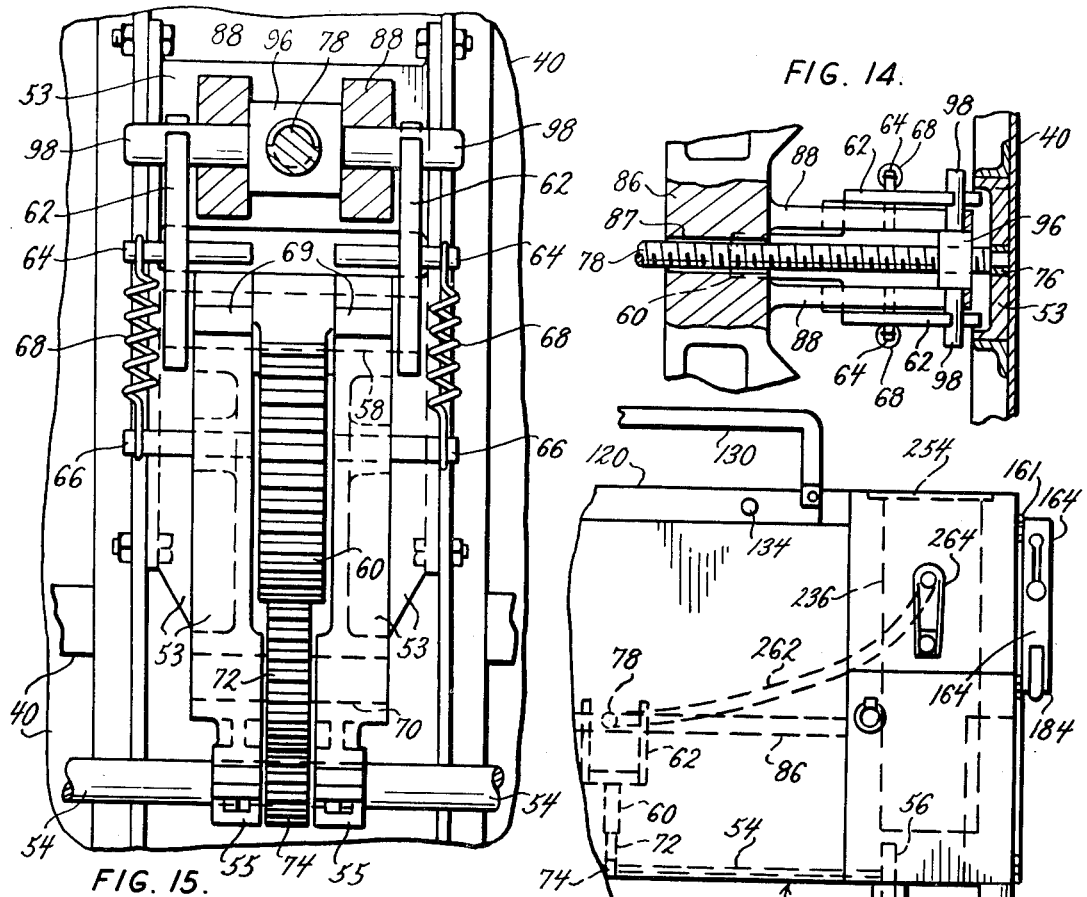
FIG. 14.
FIG. 15.
FIG. 22.
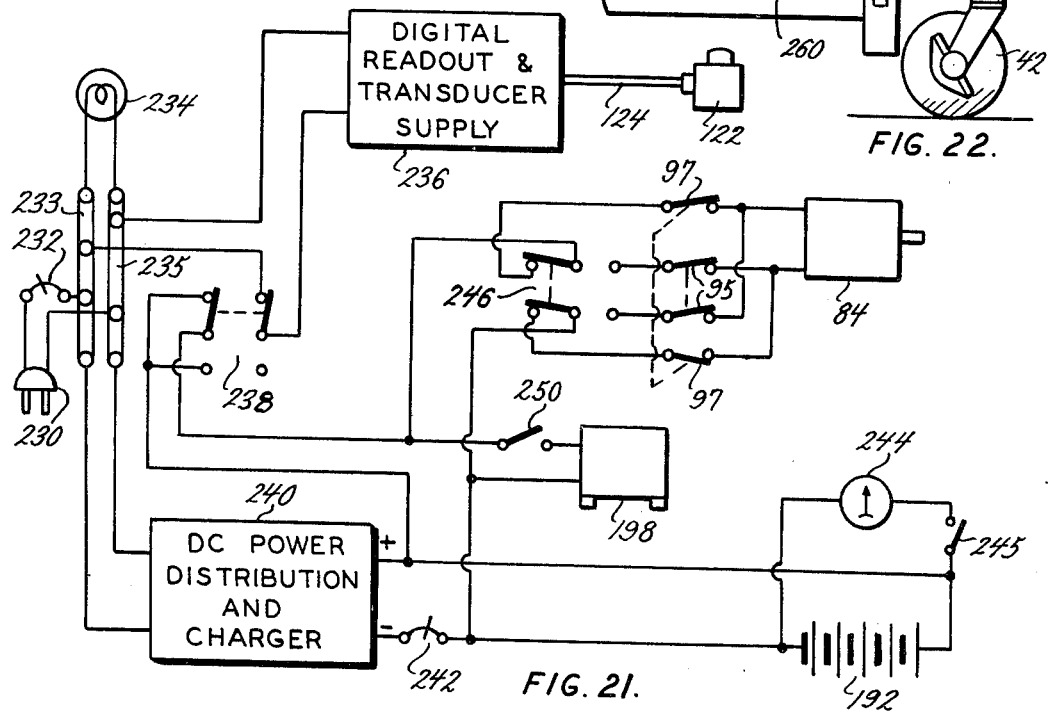
FIG. 21.

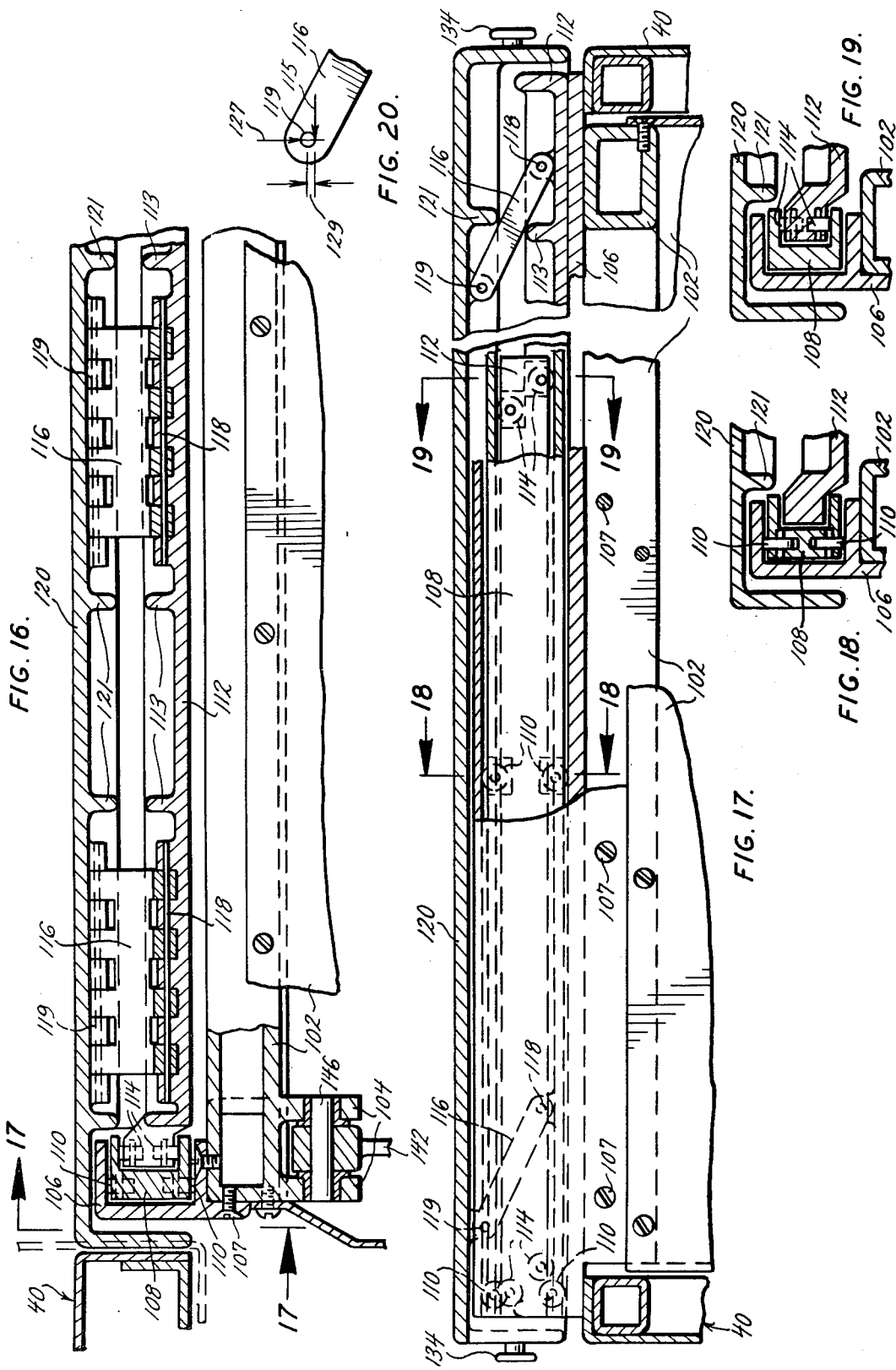

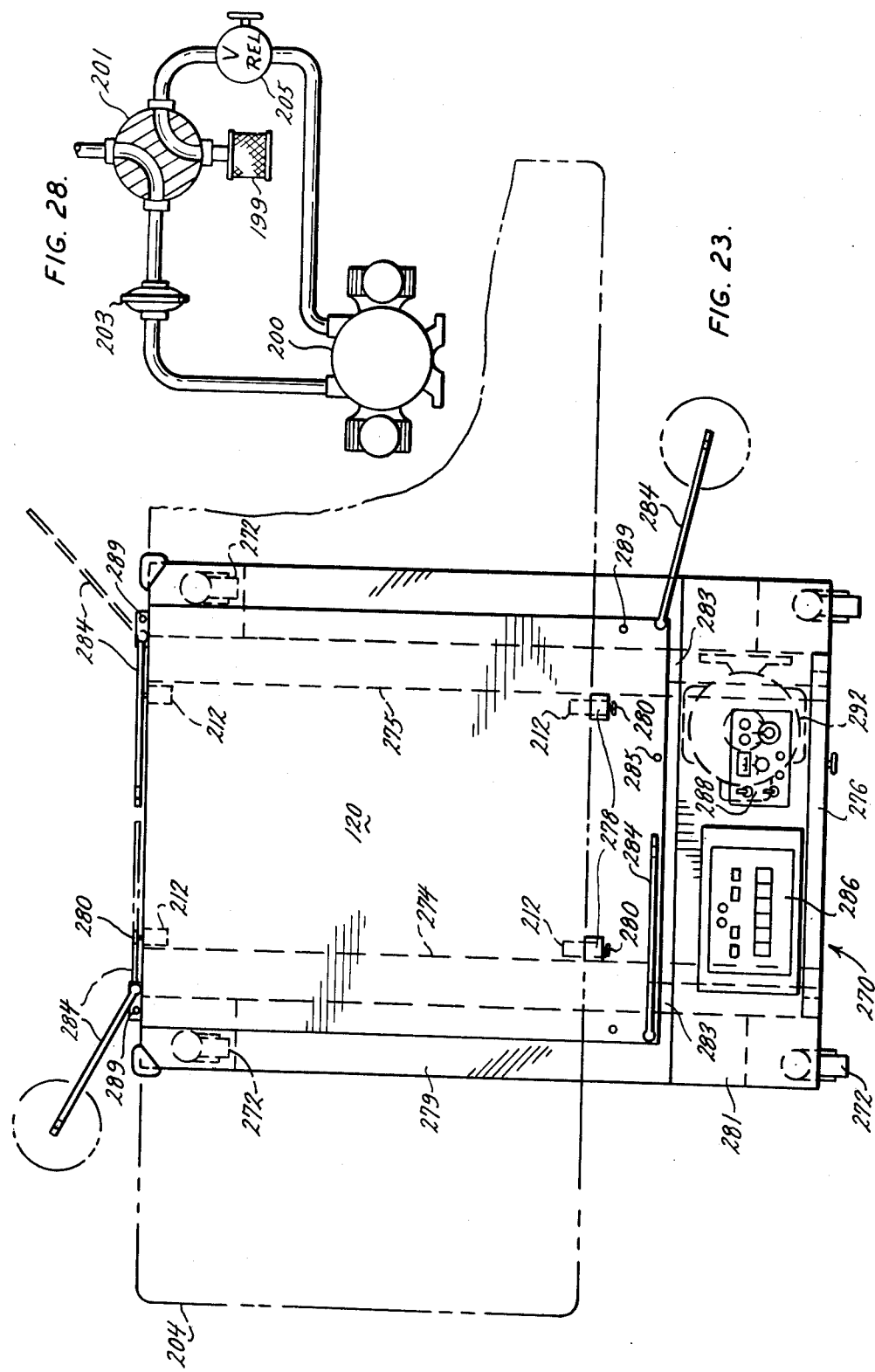

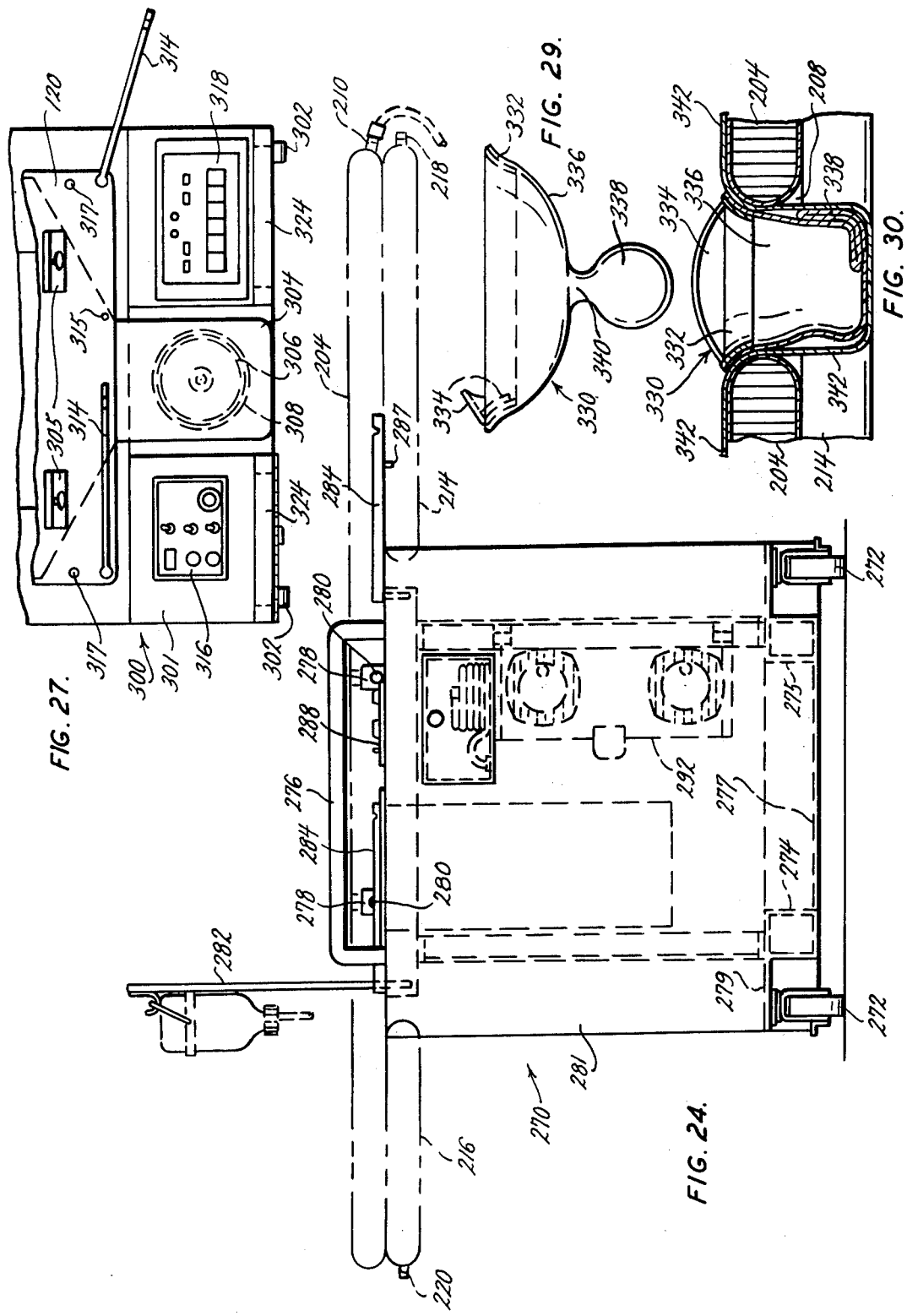

PORTABLE SUPPORT FOR A BED PATIENT

This is a division of co-pending application Ser. No. 420,083 which was filed Nov. 29, 1973, now U.S. Pat. No. 3,876,018, and which was a division of application Ser. No. 214,806 which was filed Jan. 3, 1972 and granted as U.S. Pat. No. 3,795,284.

This invention relates to improvements in portable supports for bed patients. More particularly, this invention relates to improvements in portable supports for bed patients who must be handled with care.

It is, therefore, an object of the present invention to provide a portable support for use with bed patients who must be handled with care.

The present invention provides a normally-deflated, readily-flexible, inflatable pad which can overlie a mattress on a bed and underlie a bed patient. The material of which that inflatable pad is made is so thin and flexible that the bed patient can rest on that inflatable pad without discomfort, even when that inflatable pad is deflated. As that inflatable pad is inflated, it will gently but firmly elevate the bed patient until the bed patient is several inches above the mattress. The portions of the inflatable pad which are not overlain by the bed patient will tend to inflate before the remaining portions of that inflatable pad can become inflated. This means that the perimetral portions of the inflatable pad will tend to inflate before the central portion of that inflatable pad can become inflated; and the prompt inflation of those perimetral portions will enable the inflatable pad to cradle the bed patient, and thereby avoid any tendency of the bed patient to roll, as that inflatable pad is being inflated. Once the inflatable pad has been inflated, it will constitute a firm supporting surface for the bed patient. When that inflatable pad is to be deflated, the weight of the bed patient will deflate the central portion of that inflatable pad before the perimetral portions of that inflatable pad become deflated. This means that the perimetral portions of the inflatable pad will tend to cradle the bed patient, and thereby avoid any tendency of the bed patient to roll, as that inflatable pad is being deflated. It is, therefore, an object of the present invention to provide an inflatable pad which is made from a thin and flexible material, which can be inflated to constitute a firm supporting surface for a bed patient, and which permits the perimetral portions thereof to tend to cradle the bed patient during the inflation and deflation of that inflatable pad.

One preferred embodiment of portable support provided by the present invention can be used as a lifting device for a bed patient, as a weighing device for a bed patient, and as a transporting device for a bed patient. That portable support has a carrier and a supporting surface which can be moved into position beneath an inflatable pad on which a bed patient is resting; and that carrier and supporting surface can be raised upwardly to lift the bed patient. As the bed patient is lifted, a weighing mechanism intermediate the supporting surface and carrier will develop a signal which will indicate the total weight of the inflatable pad, of the bed patient, and of his attire. Because the weight of the inflatable pad and attire will be essentially constant, any changes in the indicated weight will reflect changes in the weight of the bed patient. Also, if desired, while the bed patient is in lifted position, the bed mattress can be turned over, or reversed end for end, to make it more comfortable for the bed patient. Further, while the bed patient is in lifted position, he or she can be moved around within a given area by moving the portable support around within that given area. It is, therefore, an object of the present invention to provide a portable support which can be used as a lifting device for a bed patient, as a weighing device for a bed patient, and as a transporting device for a bed patient.

The said one preferred embodiment of portable support has a wheel-equipped chassis and has a carrier and a supporting surface that can be moved laterally away from that wheel-equipped chassis and into position beneath the inflatable pad on which a bed patient is resting, that can be raised upwardly to lift the bed patient, and that can then be moved back into position adjacent that wheel-equipped chassis to move the bed patient into position adjacent that wheel-equipped chassis. The width of that wheel-equipped chassis is narrower than the width of an average door in a hospital or nursing home; and hence that preferred embodiment of portable support can be used to transport a bed patient between various rooms or areas in a hospital or nursing home. It is, therefore, an object of the present invention to provide a portable support with a relatively-narrow, wheel-equipped chassis which has a carrier and a supporting surface that can be moved laterally away from that wheel-equipped chassis and into position beneath an inflatable pad on which a bed patient is resting, that can be raised upwardly to lift the bed patient, and that can then be moved back into position adjacent that wheel-equipped chassis to move the bed patient into position adjacent that wheel-equipped chassis.

The weight of a bed patient will apply a downwardly-acting force to the carrier and supporting surface of the said one preferred embodiment of portable support — as that carrier and supporting surface lift that bed patient; and that downward force will develop a rotative moment which will tend to cause that portable support to tilt. Any such tilting will be prevented by stabilizing legs which are carried by that portable support and which move laterally of that portable support to engage the floor at points below the bed patient. Those stabilizing legs will automatically move into stabilizing position before the carrier and supporting surface can start to lift the bed patient, and those stabilizing legs will automatically move into retracted position when that carrier and supporting surface are lowered to their normal positions. When the stabilizing legs are in stabilizing position, the total width of the portable support is greater than the width of an average door in a hospital or nursing home; but, when those stabilizing legs are in retracted position, the total width of the portable support is less than the width of such a door. As a result, the present invention provides a portable support which is narrow enough to pass through the average-width doors of a hospital or nursing home, and yet is sufficiently stable to enable the carrier and supporting surface thereof to be moved laterally away from it and into position beneath an inflatable pad to lift that inflatable pad and a bed patient resting thereon. It is, therefore, an object of the present invention to provide a portable support which is narrow enough to pass through the average-width doors of a hospital or nursing home, and yet is sufficiently stable to enable the carrier and supporting surface thereof to be moved laterally away from it and into position beneath an inflatable pad to lift that inflatable pad and a bed patient resting thereon.

A less expensive portable support, which can lift an inflated pad and a bed patient resting thereon, can be provided by making that portable support with a base that always underlies the carrier and supporting surface of that portable support. The base of that portable support will fully prevent any tilting of that portable support when that carrier and supporting surface lift an inflatable pad and a bed patient resting thereon. The opposite ends of that inflatable pad will extend outwardly beyond the sides of that portable support, and will thereby keep that portable support from being moved endways through an average-width door of a hospital or nursing home; and the length of that portable support is greater than the width of such a door. As a result, that portable support is unable to pass through an average-width door of a hospital or nursing home while it is supporting an inflated pad and a bed patient thereon. However, that portable support can be freely moved around within any given space or room while it is supporting an inflated bed and a bed patient thereon, and it can be moved through an average-width door of a hospital or nursing home whenever it is not supporting an inflated pad. That embodiment of portable support can lift and lower an inflated pad and a bed patient thereon, can weigh that bed patient, and can move that bed patient around within a given space or room. It is, therefore, an object of the present invention to provide a portable support with a base that always underlies the carrier and supporting surface of that portable support and which can raise and lower that carrier and supporting surface to lift and lower an inflated pad and a bed patient thereon.

An even less expensive portable support, which can hold an inflated pad and a bed patient resting thereon, can be provided by making that portable support with a base that always underlies the carrier and supporting surface of that portable support and by making that carrier and supporting surface stationary relative to that base. The carrier and supporting surface of that portable support can be moved into position beneath an inflated pad and a bed patient thereon; and then the bed can be lowered to enable the weight of the inflated pad and of the bed patient to be transferred to that carrier and supporting surface. At such time, the weight of the inflated pad and of the bed patient can be noted; and the portable support can be moved around within a given space or room to move the bed patient around within that space or room. Subsequently, when it is desired to have the bed again support the inflated pad and the bed patient, the carrier and the supporting surface of the portable support will be moved into position above the bed, and then that bed will be raised upwardly until it engages and supports the inflated pad and the bed patient thereon. It is, therefore, an object of the present invention to provide a portable support with a base that always underlies the carrier and supporting surface of that portable support and that holds that carrier and supporting surface stationary relative to that base.

The supporting surfaces of the various portable supports provided by the present invention are equipped with fittings that enable them to support bottles of blood, plasma, glucose, saline solution, or the like, or to hold receptacles which are attached to catheters or tubes within the bed patient. As a result, the various portable supports provided by the present invention can be used to weigh bed patients and to move those bed patients around within a given space or room without any need of interrupting the flow of blood, plasma, glucose, saline solution, or the like into the bed patient, and without any need of interrupting the flow of fluids from the bed patient. It is, therefore, an object of the present invention to provide a portable support with a supporting surface which has fittings that enable it to support bottles of blood, plasma, glucose, saline solution, or the like, or to hold receptacles which are attached to catheters or tubes within the bed patient.

The weighing mechanism, in each of the portable supports provided by the present invention, need only weigh the inflatable pad, the bed patient, and the bed patient's attire. Because the inflatable pad is light in weight and because the patient's attire is light in weight, the bed patient's weight constitutes the greatest proportion of the total weight sensed by the weighing mechanism. Such an arrangement is far more desirable than is an arrangement wherein the bed, as well as the bed patient, must be weighed; because in the former arrangement the weight of the bed patient is a very high percentage of the total weight, whereas in the latter arrangement the weight of the bed patient is a much smaller percentage of the total weight. It is, therefore, an object of the present invention to provide a portable support which only weighs an inflatable pad, a bed patient on that inflatable pad, and the attire of that patient.

The weighing mechanism in each of the portable supports of the present invention does not require much vertical movement of the supporting surface of that portable support, and thus does not require much vertical movement of the inflatable pad or of the bed patient. This is desirable, because it permits a bed patient to be weighed even though some of his or her limbs are held by traction frames, and even though the upper portion of the bed patient is encased within an oxygen tent. It is, therefore, an object of the present invention to provide a portable support which utilizes a weighing mechanism that does not require much vertical movement of the supporting surface of that portable support.

The various portable supports provided by the present invention make it possible for one person to lift a bed patient and to move that bed patient around within a given space or room. Also, those portable supports make it possible for that one person to accurately weigh that bed patient. Further, those portable supports make it possible for that one person to do any or all of those things without causing any discomfort to that bed patient. It is, therefore, an object of the present invention to provide a portable support which makes it possible for one person to lift a bed patient, to move that bed patient around within a given, space or room, and to accurately weigh that bed patient without causing any discomfort to that bed patient.

The various portable supports provided by the present invention can be used to monitor the weight of a bed patient on a periodic or continuous basis. Where any of those portable supports is used to monitor the weight of a bed patient on a periodic basis, that portable support will be caused to recurrently hold that bed patient above the bed long enough to enable a reading of his or her weight to be taken. Where any of those portable supports is used to monitor a bed patient's weight on a continuous basis, that portable support will be caused to continuously hold the bed patient. In all events, the bed patient is held in a comfortable positon while being weighed. It is, therefore, an object of the present invention to provide a portable support which can monitor the weight of a bed patient on a periodic or continuous basis.

The normally-deflated, readily-flexible, inflatable pad provided by the present invention has a passage therethrough in register with the rectal area of a bed patient. That passage permits a bedpan to be placed beneath the rectal area of the bed patient whenever the inflatable pad is inflated to lift the bed patient above the level of the bed. Such an inflatable pad makes it possible for the waste products of the bed patient to be collected with an absolute minimum of discomfort for that bed patient. It is, therefore, an object of the present invention to provide a normally-deflated, readily-flexible, inflatable pad that has a passage therethrough in register with the rectal area of a bed patient.

Other and further objects and advantages of the present invention should become apparent from an examination of the drawing and accompanying description.

In the drawing and accompanying description several preferred embodiments of the present invention are shown and described but it is to be understood that the drawing and accompanying description are for the purpose of illustration only and do not limit the invention and that the invention will be defined by the appended claims.

BRIEF DESCRIPTION OF THE DRAWING

In the drawing,

FIG. 2 is an elevational view of the right-hand end of the portable support shown in FIG. 1, as it appears when the right-hand wing thereof is in its lowered position, FIG. 3 is a side elevational view of the portable support shown in FIG. 1, FIG. 4 is a perspective view of an inflated pad which can be used with the portable support shown in FIG. 1, FIG. 5 is an elevational view, on a larger scale, of part of the supporting surface and inflated pad of the portable support shown in FIG. 1, and it is taken along the plane indicated by the line 5—5 in FIG. 2, FIG. 6 is a sectional view, on a scale intermediate those of FIGS. 1 and 5, of a portion of the portable support of FIG. 1, and it is taken along the plane indicated by the line 6—6 in FIG. 3, FIG. 7 is a sectional view, on a scale intermediate those of FIGS. 5 and 6, of a further portion of the portable support of FIG. 1, and it is taken along the plane indicated by the line 7—7 in FIG. 1, FIG. 8 is a sectional view, on a scale intermediate those of FIGS. 1 and 7, through another portion of the portable support of FIG. 1, and it is taken along the plane indicated by the line 8—8 in FIG. 3, FIG. 11 is a partially broken away, partically sectioned view, on the scale of FIG. 9, through the portable support of FIG. 1, and it is taken along the plane indicated by the line 11—11 in FIG. 1, FIG. 12 is a further sectional view, on the scale of FIG. 9, through the portable support of FIG. 1, and it is taken along the plane indicated by the line 12—12 in FIG. 11, FIG. 13 is another sectional view, on the scale of FIG. 9, through the portable support of FIG. 1, and it is taken along the plane indicated by the line 13—13 in FIG. 11, FIG. 14 is yet another sectional view, on the scale of FIG. 9, through a portion of the portable support of FIG. 1, and it is taken along the plane indicated by the line 14—14 in FIG. 9, FIG. 15 is a sectional view, on a scale larger than the scale of FIG. 5, through another portion of the portable support of FIG. 1, and it is taken along the plane indicated by the line 15—15 in FIG. 9, FIG. 16 is a sectional view, on a scale close to that of FIG. 5, through a further portion of the portable support of FIG. 1, and it is taken along the plane indicated by the line 16—16 of FIG. 9, FIG. 17 is a sectional view, on the scale of FIG. 16, through the structure shown in FIG. 16, and it is taken along the plane indicated by the line 17—17 in FIG. 16, FIG. 18 is a sectional view, on the scale of FIG. 16, of the structure shown in FIG. 17, and it is taken along the plane indicated by the line 18—18 in FIG. 17, FIG. 19 is another sectional view, on the scale of FIG. 16, through the structure shown in FIG. 17, and it is taken along the plane indicated by the line 19—19 in FIG. 17, FIG. 20 is a force diagram which shows forces adjacent one of the levers in the structure of FIG. 17, FIG. 21 shows the electrical circuit of the portable support of FIGS. 1–20, FIG. 22 is an elevational view of a portion of a second preferred embodiment of portable support which differs from the portable support of FIGS. 1–20 by having a crank, rather than a motor, to raise and lower the carrier and supporting surface thereof, FIG. 23 is a plan view of a third preferred embodiment of portable support, FIG. 24 is an elevational view of the rear of the portable support shown in FIG. 23, FIG. 27 is a plan view of a portion of the portable support shown in FIG. 26, FIG. 28 is a schematic showing of the pneumatic system used in the various portable supports of FIGS. 1–27, FIG. 29 is a side elevational view of a disposable bedpan which is usable with the inflatable pad of FIG. 4, and FIG. 30 is and end elevational view of the bedpan of FIG. 29 in use with that inflatable pad.

DESCRIPTION OF THE PREFERRED EMBODIMENTS

Referring to FIGS. 1–20, the numeral 40 generally denotes a chassis for one preferred embodiment of portable support that is made in accordance with the principles and teachings of the present invention. As indicated particularly by FIGS. 1–3 and 9, that chassis is prismatic in form, is defined by horizontally-extending and vertically-extending structural members, and is enclosed by exterior walls which are secured to those structural members. Casters 42, of standard and usual design, are secured to the bottom of the chassis 40 adjacent the four corners thereof; and those casters are equipped with latches. When those latches are released, the chassis 40 can be wheeled in any direction to any desired position within a hospital or nursing home; but, when those latches are set, the chassis 40 will remain stationary.

Figures 9, 10:
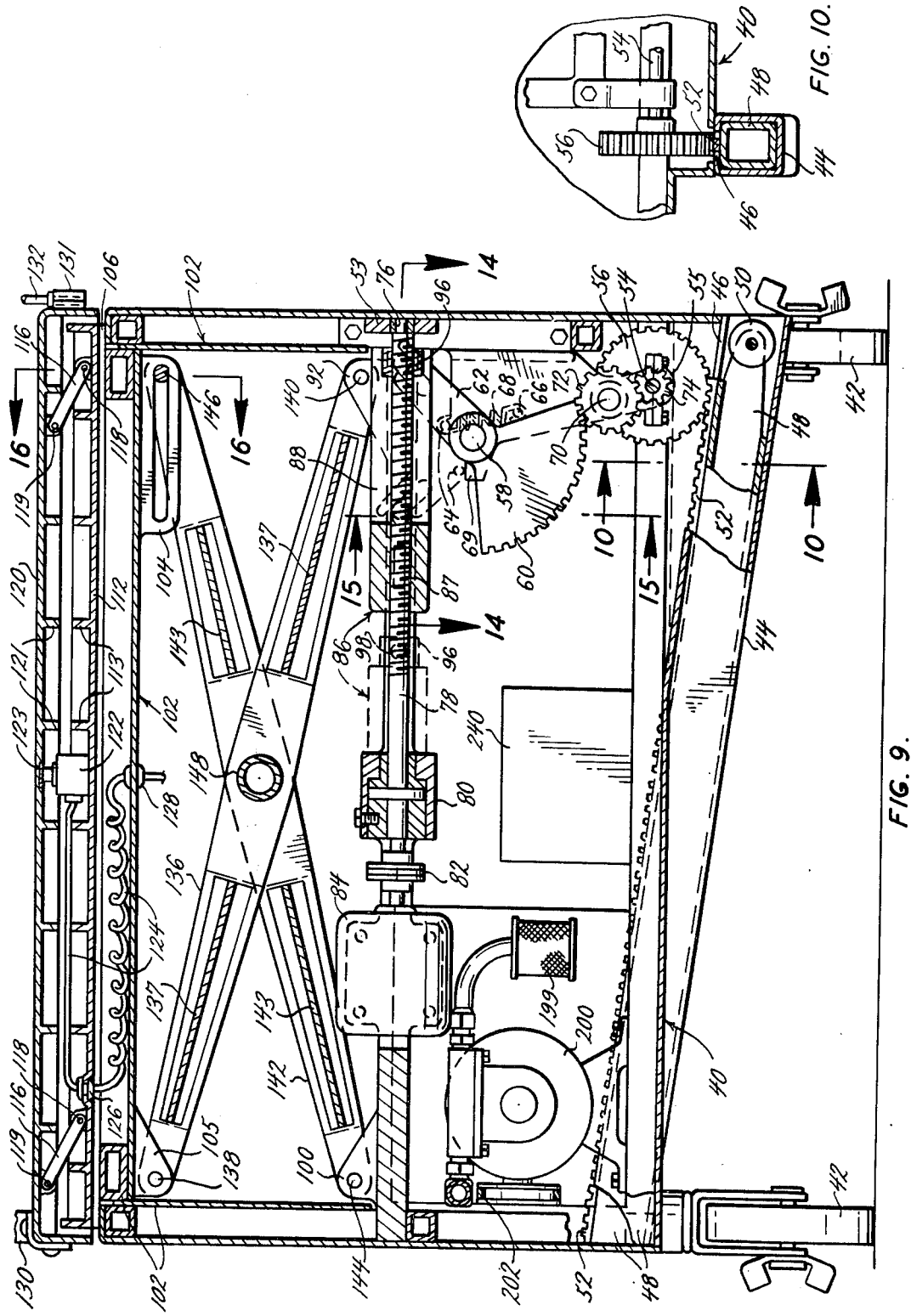
FIG. 9 is a sectional view, on a scale intermediate those of FIGS. 1 and 8, through the portable support of FIG. 1, and it is taken along the plane indicated by the line 9—9 of FIG. 3.
FIG. 10 is a sectional view, on the scale of FIG. 9, through a portion of the portable support of FIG. 1, and it is taken along the plane indicated by the line 10—10 in FIG. 9.

The numeral 44 denotes two channels which have slots 46 in the upper surfaces thereof; and those channels are located adjacent the bottom of the chassis 40. As indicated particularly by FIGS. 2 and 9, the channels 44 incline downwardly at a shallow angle from the left-hand or rear face of the chassis toward the right-hand or front face of that chassis. Elongated stabilizing legs 48, which are shown in FIG. 10 as hollow beams of rectangular cross section, are slidably mounted within the channels 44. Rollers 50 are rotatably mounted at the front ends of the stabilizing legs 48; and elongated racks 52 are provided on the upper surfaces of those stabilizing legs. Those racks extend upwardly through, and above the levels of, the slots 46 in the channels 44, as indicated particularly by FIGS. 9 and 10.

The numeral 53 denotes a supporting sub-frame which is mounted at the inner face of the front end of the chassis 40, as indicated particularly by FIGS. 9 and 15. An elongated shaft 54 is mounted in bearing blocks 55 which are part of the supporting sub-frame 53, and which are shown particularly by FIG. 15. That shaft is close to, and extends parallel to, the lower part of the front of the chassis 40, as indicated particularly by FIG. 9. Pinions 56 are fixedly secured to the outer ends of the shaft 54; and those pinions mesh with, and drive, the racks 52 on the upper surfaces of the stabilizing legs 48, as indicated by FIGS. 1–3 and 9.

The numeral 58 denotes a pivot which is mounted in the supporting sub-frame 53; and that pivot is shown particularly by FIGS. 9 and 15. A gear segment 60, with slotted arms 62, is rotatably mounted on the pivot 58; and that gear segment is shown particularly by FIGS. 9, 14 and 15. Pins 64 are carried by the lower ends of the slotted arms 62 of gear segment 60; and those pins project both outwardly and inwardly of those arms, as shown particularly by FIG. 15. Pins 66 are secured to the sub-frame 53, and they project outwardly beyond both sides of that sub-frame at a point below the level of the pivot 58, as shown particularly by FIGS. 9 and 15; and the opposite ends of those pins receive the lower ends of helical extension springs 68. The upper ends of those helical extension springs are held by the pins 64 in the slotted arms 62 of gear segment 60, as shown particularly by FIGS. 9, 14 and 15.

Stops 69 are formed on the sub-frame 53 at the approximate level of the axis of the shaft 58, as shown particularly by FIGS. 9 and 15. Those stops are in the paths of the confronting ends of the pins 64 on the gear segment 60; and those stops limit rotation of that gear segment in the counter clockwise direction in FIG. 9. The helical extension springs 68 bias the pins 64 on the gear segment 60 away from the stops 69 whenever that gear segment is in the solid-line position shown in FIG. 9, but those helical extension springs bias those pins toward those stops whenever that gear segment is in the dotted-line position shown in FIG. 9.

The numeral 70 denotes a shaft which is rotatably supported within bearings that are located in the supporting sub-frame 53 above the level of the bearing blocks 55, as shown particularly by FIGS. 9 and 15. A pinion 72 is fixedly mounted on, and thus will rotate with, the shaft 70; and a pinion 74 is fixedly mounted on, and thus will rotate with, the shaft 54. The teeth on the pinions 72 and 74 mesh with each other; and the teeth on the pinion 72 mesh with the teeth on the gear segment 60. As a result, rotation of that gear segment in the counter clockwise direction in FIG. 9 will effect counter clockwise rotation of the shaft 54. Coversely, clockwise rotation of that gear segment will effect clockwise rotation of that shaft.

The numeral 76 denotes a bushing which is mounted in the supporting sub-frame 53, as shown particularly by FIG. 9; and that bushing rotatably supports one end of an elongated lead screw 78. That lead screw is horizontally disposed, and it extends from the front of the chassis 40 toward the rear of that chassis, as shown by FIG. 9. A bearing housing 80, which is supported by the chassis 40, has a bearing therein that rotatably supports the rear end of the lead screw 78. A flexible coupling 82 connects the rear end of that lead screw to the output shaft of a reversible gear motor 84. That gear motor is mounted on a suitable supporting element within the chassis 40, as indicated particularly by FIGS. 9 and 11.

Figure 1:
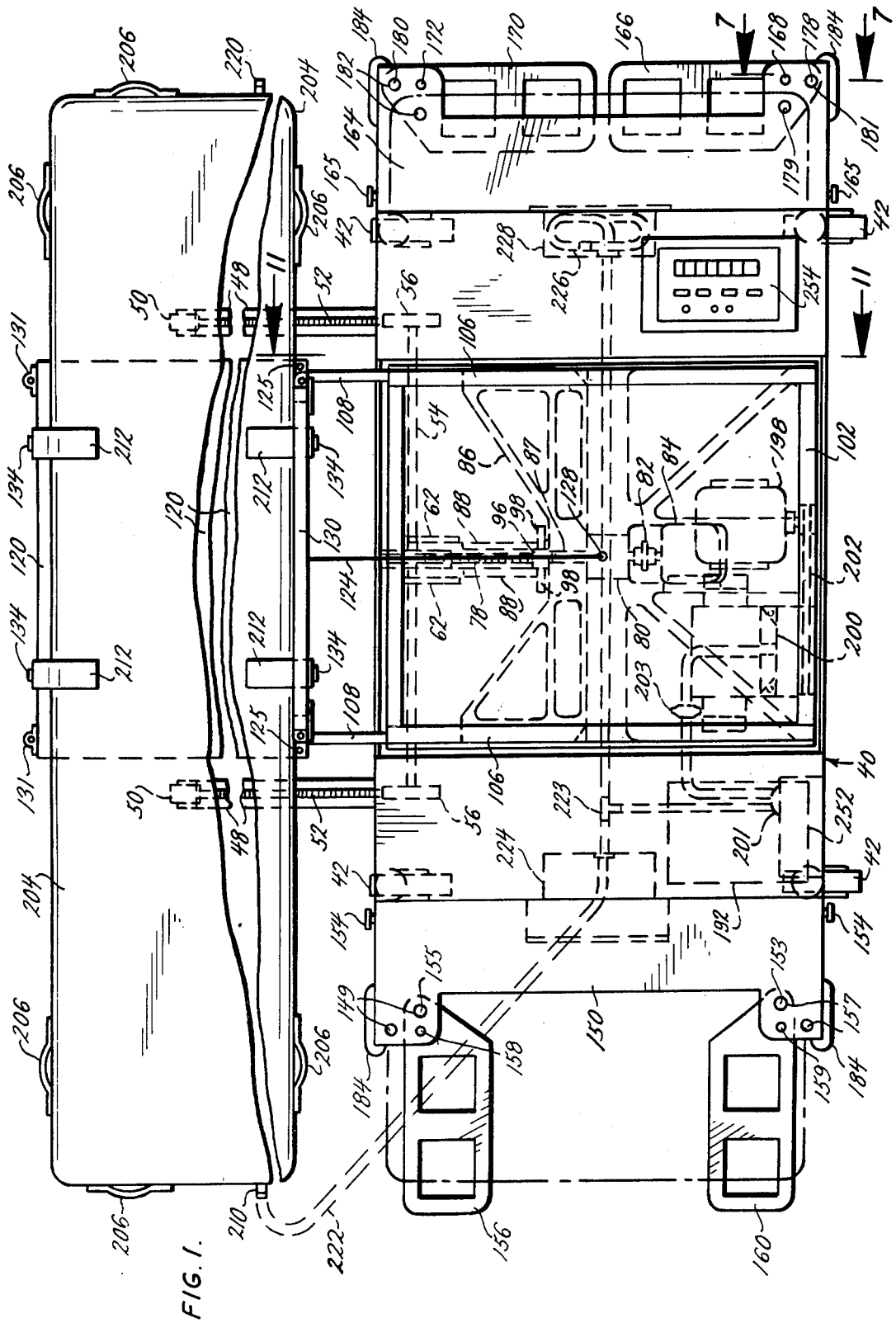
FIG. 1 is a partially-broken, plan view of one preferred embodiment of portable support that is made in accordance with the principles and teachings of the present invention.

The numeral 86 generally denotes a slide which has a straight rear edge, but which has a front edge that is defined by rearwardly-inclined converging surfaces, as indicated by FIGS. 1, 12 and 14. The central portion of the slide 86 has a cylindrical passage 87 through it that has an inner diameter which is larger than the diameter of the lead screw 78, as shown particularly by FIG. 14. The slide 86 has horizontally-directed arms 88, as shown particularly by FIGS. 1 and 14; and those arms have slots therein, as shown by FIG. 15. Projections 90, which are shown particularly by FIGS. 11–13, extend outwardly from the opposite sides of the slide 86. Slotted bosses 92 are formed on the upper surface of the guide 86 adjacent the front edge of that upper surface, as shown particularly by FIGS. 11–13.

Guide channels 94 are fixedly mounted within the chassis 40; and those guide channels extend from the front to the rear of that chassis adjacent the inner surfaces of the sides of that chassis, as shown particularly by FIGS. 11–13. Those guide channels receive and guide the projections 90 on the slide 86, and thus help guide movement of that slide. A double pole, single throw limit switch 95 is mounted on the chassis 40 in position to be actuated by the slide 86 as that slide moves into the position of FIGS. 11 and 12. A double pole, single throw limit switch 97 is mounted on that chassis in position to be actuated by that slide as that slide moves into the solid-line position of FIG. 9. A follower block 96, that is shown particularly by FIGS. 9, 14 and 15, has an internal thread which mates with the thread of the lead screw 78. Pins 98 are fixedly secured to, and extend outwardly from, both sides of the follower block 96, as shown particularly by FIGS. 14 and 15. Those pins are disposed within, and are confined and guided by, the slots in the slotted arms 88 of the slide 86.

Slotted bosses 100 are formed on a portion of the chassis 40 adjacent the rear of that chassis, as shown particularly by FIGS. 9, 11 and 12. Those slotted bosses are located at the same approximate level as the slotted bosses 92 on the slide 86; and those slotted bosses are in general alignment with the slotted bosses 92.

The numeral 102 generally denotes a platform which is rectangular in plan and in elevation, and which can be moved from the lowered position of FIG. 9 to the raised position of FIG. 11. Slotted bosses 104 are provided at the underside of the platform 102, adjacent the front of that platform, as indicated by FIGS. 9 and 11. Slotted bosses 105 are provided at the underside of the platform 102, adjacent the rear of that platform, as indicated by FIGS. 9 and 11.

The numeral 106 denotes channels which are carried by the platform 102 at the top thereof; and those channels extend from the front to the rear of that platform, and they are located adjacent the opposite sides of that platform. As shown particularly by FIG. 16, the channels 106 have flanges which extend short distances downwardly at the opposite sides of the platform 102. Screws 107 extend through those flanges and seat in threaded openings within the opposite sides of the platform 102, as shown by FIG. 16, to fixedly secure the channels 106 to that platform. Elongated slides 108 are dimensioned to fit within the channels 106, as indicated particularly by FIGS. 11 and 16–19; and those elongated slides are generally C-shaped in cross section but have thick webs. Recesses are formed in the upper and lower surfaces of the thick webs of the elongated slides 108 to accommodate rollers 110. Those rollers engage the confronting faces of the upper and lower flanges of the channels 106, and thereby facilitate ready telescoping movement of those slides relative to those channels. The numeral 112 denotes a generally-rectangular carrier which has a length just shorter than the length of the platform 102, and which has a width that is slightly greater than the width of the platform 102, as shown particularly by FIGS. 16 and 17. The sides of the platform 112 are offset slightly upwardly and are disposed within the slides 108, as indicated particularly by FIGS. 16 and 17. Rollers 114 are disposed within recesses in the upper and lower surfaces of the sides of the carrier 112; and those rollers engage the confronting surfaces of the upper and lower flanges of the elongated slides 108. As a result, the carrier 112 can freely telescope relative to the slides 108, while the slides 108 telescope freely relative to the channels 106. All of this means that the carrier 112 can be shifted forwardly from the position of FIG. 9, wherein it is in register with the platform 102, to the position of FIGS. 1, 2 and 11, wherein it is disposed wholly forwardly of that platform.

Hinge plates 116 are pivotally secured to the carrier 112 by hinge pins 118, as shown particularly by FIGS. 16 and 17. One set of hinge plates 116 is disposed adjacent the rear edge of the carrier 112 and extends lengthwise of that carrier, while a second set of those hinge plates is disposed adjacent the front of that carrier and also extends lengthwise of that carrier — all as indicated by FIGS. 9 and 17. A generally-rectangular supporting surface 120 is secured to the upper ends of the hinge plates 116 by hinge pins 119, as shown by FIGS. 9 and 17. That supporting surface overlies the carrier 112; and the edges thereof extend short distances outwardly beyond the edges of that carrier.

The carrier 112 has spaced, upstanding ribs 113, and also has a perimetral upstanding flange. Those ribs and that flange stiffen and reinforce that carrier, and thereby enable that carrier to be sturdy and strong although light in weight. The supporting surface 120 has spaced, downwardly-extending ribs 121 plus a downwardly-extending perimetral flange. Those ribs and that flange stiffen and reinforce that supporting surface, and thereby enable that supporting surface to be sturdy and strong although light in weight.

The numeral 122 denotes a pressure transducer of standard design and construction, and that pressure transducer is supported by the carrier 112 adjacent the geometric center of that carrier. The numeral 123 denotes an insert of hard material in the underface of the supporting surface 120; and that insert is in register with the movable element of the pressure transducer 122. The upper surface of that movable element is spherical in configuration to enable it to have point contact with the hard insert 123; and such contact is desirable because it will make certain that the pressure transducer is centrally loaded by a single concentrated load.

The hinge plates 116, the carrier 112 and the supporting surface 120 essentially act as a four-bar, linkage mechanism which is arranged as a quadrilateral, which has the opposite sides thereof parallel, and which defines equal oblique angles and equal acute angles; and this is desirable, because such a linkage mechanism enables all of the weight of the supporting surface 120 and of any thing and anyone resting thereon to be concentrated at the hard insert 123 as a vertically-directed load. In this way, the portable support of the present invention obviates the cost and the potential errors inherent in the use of a plurality of pressure transducers or load-sensing cells which have the outputs thereof suitably totaled. Any internal loads which develop in the four-bar, linkage mechanism will be in static equilibrium, and thus will produce no significant rotation in the load which is concentrated at the hard insert 123. Further, because any displacement of the center of gravity of the supporting surface 120 and of anything and anyone resting thereof relative to the hard insert 123 will merely produce a variation in the internal loads in the hinge plates 116 of the four-bar, linkage mechanism, it is not necessary that the said hard insert be at the precise geometric center of the supporting surface 120, and it is not necessary that the pressure transducer 122 be at the precise geometric center of the carrier 112.

The only disturbance forces which could tend to decrease the accuracy of the weight-indicating signals developed by the pressure transducer 122 would be those caused by friction. The numeral 115 in FIG. 20 denotes an arrow which represents a horizontally-directed frictional force that is the product of a downwardly-acting force — represented by the arrow 127 — and its associated coefficient of friction; and that horizontally-directed frictional force acts at a small radial distance — indicated by the numeral 129 — below the center line of a hine pin 119. That horizontally-directed frictional force will develop a resistive moment of force that will have to be overcome by the load applied to the supporting surface 120; but that resistive moment of force will be essentially insignificant because the diameter of the hinge pin 119 is very small, and because the surface of that hinge pin and of the complementary opening in the hinge plate 116 will be smooth, hard and lubricated. The overall result is that the four-bar, linkage mechanism enables the pressure transducer 122 to indicate the total weight of the supporting surface 120 and of anything and anyone resting thereon with a high degree of repeatable accuracy. The pressure transducer 122 has a movable element which moves only a very small fraction of an inch as a bed patient is being weighed. If desired, that pressure transducer could be a resistance-type load-sensing cell or could be a piston of a hydraulic weight-sensing system.

A flexible insulated conductor 124 extends from the pressure transducer 122 to and through a grommet 126 in the carrier 122, and then extends to and through a grommet 128 in the upper surface of the platform 102, as shown by FIG. 9. That conductor extends to a digital readout and transducer supply 236 which is shown in FIG. 21. The portion of the flexible conductor 124 which is intermediate the grommets 126 and 128 preferably is made so it tends to assume a generally helical configuration, as shown by FIG. 9; because such a configuration enables that conductor to accommodate movement of the carrier 112 and of the supporting surface 120 from the position shown in FIG. 9 to the position shown in FIGS. 1, 2 and 11. In FIG. 1, the conductor 124 is shown as being absolutely straight; but even when the supporting surrface 120 is in the position shown in FIGS. 1, 2 and 11, the conductor 124 will have some slack in it.

The numeral 130 denotes a handle that is fixedly secured to the rear edge of the supporting surface 120; and that handle resembles an inverted U in elevation, as shown particularly by FIG. 3. That handle can be used to apply forces to the supporting surface 120 which will cause that supporting surface and the carrier 112 to move from the retracted position of FIG. 9 to the moved position of FIGS. 1, 2, and 11. Conversely, the handle 130 can be used to apply forces to the supporting surface 120 which will cause that supporting surface and the carrier 112 to move from the moved position of FIGS. 1, 2 and 11 to the retracted position of FIG. 9.

The supporting surface 120 has sockets 131 secured thereto adjacent one edge thereof; and those sockets can releasably receive hangers 132. Those hangers can be used to support containers, such as the container 256 in FIG. 2, for blood, plasma, glucose, saline solution, or the like. The supporting surface 120 also is provided with several headed pins 134, as indicated by FIGS. 1-3 and 17. In addition, the supporting surface 120 has sockets 125 therein which can releasably receive the hangers 132.

Referring to FIGS. 9 and 11, the numeral 136 denotes a lever which has two end plates that are held in fixedly-spaced relation by two connecting plates 137. The end plates of the lever 136 are disposed a short distance inwardly of the inner faces of the sides of the platform 102; and the connecting plates 137 of that lever extend lengthwise of that platform.

Pins 138 rotatably secure the upper ends of the end plates of the lever 136 to the slotted bosses 105, and thus to the platform 102, as shown by FIGS. 9 and 11. Pins 140 rotatably secure the lower ends of the end plates of the lever 136 to the slotted bosses 92 of the slide 86, as shown by FIGS. 9 and 11.

The numeral 142 denotes a lever which is essentially identical with the lever 136 — having two end plates and two connecting plates 143. The end plates of the lever 142 are disposed outwardly of the end plates of the lever 136 but inwardly of the inner surfaces of the sides of the platform 102, and the connecting plates 143 of the former lever extend longitudinally of that platform. As shown particularly by FIG. 9, portions of the end plates of the levers 136 and 142 are cut away to reduce the weights of those levers. Pins 144 rotatably secure the lower ends of the end plates of the lever 142 to the slotted bosses 100 of the chassis 40. Pins 146 slidably and rotatably secure the upper ends of the end plates of the lever 142 to the slotted bosses 104 of the platform 102.

An elongated pivot 148 extends through the end plates of the lever 136 and are secured to the end plates of the lever 142. That pivot holds the levers 136 and 142 in assembled relation with each other, while permitting those levers to rotate relative to each other about the geometric centers thereof. The slide 86, the levers 136 and 142, and the platform 102 essentially act as a scissors-type jack.

The numeral 150 denotes a wing which is shown in plan view in FIG. 1 and in side view in FIG. 3. A similar wing 164 is shown in plan view in FIG. 1, in end view in FIG. 2, in side view in FIG. 3, and in section in FIG. 6. A hinge 151 has one plate thereof secured to the chassis 40, and has the other plate thereof secured to the under surface of the wing 150; and that hinge permits that wing to be rotated into and out of the dotted-line and solid-line positions in FIG. 3. Similarly, a hinge 161 has one plate thereof secured to the chassis 40, and has the other plate thereof secured to the under surface of the wing 164; and that hinge permits that wing to be rotated into and out of the dotted-line and solid-line positions in FIG. 3.

The wing 150 has slots 152 in the sides thereof, and the wing 164 has slots 162 in the sides thereof. As shown particularly by FIG. 6, the wing 164 has a bar-like latch 174 therein, and that latch has a recess therein. A pin 165 has the inner end thereof disposed within the recess in the latch 174, and it has the outer end thereof extending outwardly of the slot 162. A helical compression spring 176 urges the pin 165 outwardly into locking position within the slot 162. The head of the pin 165 is undercut to provide a small-diameter portion which can slide freely through the slot 162; but a shoulder 167 on that pin is too large to fit into the normal-width portion of that slot, and can only fit into larger-diameter openings at the ends of that slot.

When the wing 164 is in the dotted-line position in FIG. 3, the bar-like latch 174 will be located wholly out of the chassis 40 and will be wholly within the wing 164; and the shoulder 167 of the pin 165 will be in the large-diameter opening at that end of the slot 162 which is most remote from the hinge 161. At such time, the wing 164 can be rotated freely into and out of the dotted-line position in FIG. 3. When the wing 164 is to be set in the solid-line position in FIG. 3, that wing will be raised to that position; and then the pin 165 will be pushed inwardly, against the pressure of the spring 176, and that pin will be moved to the solid-line position in FIG. 6. As the pin 165 is moved from the dotted-line position to the solid-line position in FIG. 6, the bar-like latch 174 will move into position within the chassis 40, and will thereby hold the wing 164 in horizontal position — thereby enabling that wing to constitute an extension of the upper surface of the chassis 40. As the bar-like latch 174 reaches the limit of its inner movement, the shoulder 167 of the pin 165 will respond to the spring 176 to move into the large-diameter opening at that end of the slot 162 which is closest to the pivot 161. The wing 164 will have two bar-type latches 174, two pins 165, two springs 176, and two slots 162; and those latches, pins, springs and slots will be in register with each other. The wing 150 will have two slots 152 which will perform the functions performed by the slots 162, will have two pins 154 which will perform the functions of the pins 165, will have two springs, not shown, which will perform the functions of the springs 176, and will have two bar-type latches, not shown, which will perform the functions of the bar-type latches 174. As a result, the wing 150 can be latched in the solid-line position in FIG. 3, or can be unlatched and moved into the dotted-line position in FIG. 3.

The numeral 156 denotes an arm which is rotatably secured to the wing 150 by a pivot 158; and the numeral 160 denotes a second arm which is rotatably secured to that wing by a pivot 159. The numeral 166 denotes an arm which is rotatably secured to the wing 164 by a pivot 168; and the numeral 170 denotes a second arm which is rotatably secured to that wing by a pivot 172. The outer edge of the wing 164 is open in nature so the arms 166 and 170 can be rotated into the positions indicated by FIGS. 1 and 2. Similarly, the outer edge of the wing 150 is open in nature so the arms 156 and 160 can be rotated into positions comparable to the positions occupied by the arms 166 and 170 in FIG. 1. Conversely, the arms 166 and 170 can be rotated outwardly to positions comparable to the positions occupied by the arms 156 and 160 in FIG. 1.

As shown particularly by FIG. 7, the arm 166 has a button 178 with a reduced diameter upper end; and a helical compression spring urges that reduced diameter upper end upwardly into the opening 179 or into the opening 181 in the wing 164. Whenever the arm 166 is in the retracted position shown by FIG. 1, the reduced diameter upper end of the button 178 will extend into and be held by the opening 181. However, whenever the arm 166 is in its extended position, the reduced diameter upper end of the button 178 will extend into and be held by the opening 179. The arm 170 carries a buttom 180 with a reduced diameter upper end; and that reduced diameter upper end will be in the forwardmost opening 182 whenever that arm is in the retracted position shown in FIG. 1, but will be in the other opening 182 whenever that arm is in its extended position.

The arm 156 has a buttom 155 which is comparable to the buttom 178 in FIG. 7, and that button will be disposed in the forwardmost opening 149 of the wing 150 whenever that arm is in its retracted position. However, the reduced diameter upper end of the button 155 will be in the other of the openings 149 in the wing 150 whenever the arm 156 is in its extended position. Similarly, the arm 160 is provided with a button 153 that can be identical to the buttom 178 of FIG. 7. That button will have the reduced diameter upper end thereof disposed within the rearmost of two openings 157 in the wing 150 whenever the arm 160 is in its retracted position, but will have that reduced diameter upper end in the other of the openings 157 whenever that arm is in the extended position shown by FIG. 1.

Whenever the wing 150 is moved into and latched in the solid-line position of FIG. 3 and the arms 156 and 160 are in the retracted positions wherein they extend part-way into that wing, and whenever the wing 164 is moved into and latched in the solid-line position of FIG. 3 and the arms 166 and 170 are in the retracted positions wherein the extend part-way into that wing, those wings will moderately increase the effective length of the portable support of FIGS. 1–20. If the effective length of that portable support needs to be increased even further, the arms 156 and 166 can be moved into, and locked in, the positions shown by FIG. 1; and the arms 166 and 170 also can be moved into, and locked in, their extended positions. On the other hand, if the effective length of the portable support should be decreased to a minimum, the wings 150 and 164 can be rotated into the dotted-line positions shown by FIG. 3.

Bumpers 184 of the resilient material are provided at the outer corners of each of the wings 150 and 164. Those bumpers will keep those corners from directly engaging the edges of any doorways through which the portable support of FIGS. 1–20 is moved. Because the chassis 40 is narrower than the width of an average-width door in a hospital or nursing home, the portable support of FIGS. 1–20 can easily be moved into and out of most spaces and rooms in a hospital or nursing home.

The numeral 188 in FIG. 3 denotes a door of a compartment, within the chassis 40, which accommodates a storage battery 192. A pull or other handle 190 is provided to enable the door 188 to be opened to check, or to service, that battery. The numeral 194 in FIG. 3 denotes a door to a further compartment within the chassis 40; and a pull or knob 196 is provided on that door to facilitate the opening of that door.

The numeral 198 denotes an electric motor which is mounted within the chassis 40; and the numeral 200 denotes an air compressor which also is mounted within that chassis. A belt 202 connects a pulley on the shaft of the motor 198 to a pulley on the shaft of the air compressor 200. The numeral 201 in FIGS. 3 and 28 denotes a manually-operated valve; and that valve is mounted on a control panel 252 on the chassis 40. One port of that valve is connected to the outlet of the compressor 200 by a pressure regulator 203, a second port of that valve is connected to flexible hoses 222 and 226, a third port of that valve is connected to the inlet of the compressor 200 by an adjustable valve 205, and the fourth port of that valve is connected to an air filter 199. Whenever the movable element of the valve 201 is in the position shown by FIG. 28 and the motor 198 is operated, the compressor 200 will draw air inwardly through the air filter 199 and the valve 201 and the adjustable valve 205, will compress that air, and will then cause that air to flow through the pressure regulator 203 and the valve 201 to the hoses 222 and 226. However, when the movable element of the valve 201 is rotated ninety degrees in the clockwise direction, the outlet of the compressor 200 will be connected to the air filter 199 by the pressure regulator 203 and that valve, and the hoses 222 and 226 will be connected to the inlet of that compressor by that valve and by the adjustable valve 205. Consequently, at such time, operation of the motor 198 will cause the compressor 200 to withdraw air from the hoses 222 and 226 and to discharge that air through the air cleaner 199; and that air cleaner will tend to act as a silencer.

Referring particularly to FIG. 4, the numeral 204 denotes an inflatable pad which is made from a readily-flexible material that is essentially air-impervious and that is essentially insensitive to sterilization media and body fluids. That inflatable pad includes an upper surface, a lower surface and a multitude of drop threads which extend between and interconnect those upper and lower surfaces; and some of those drop threads are shown by FIG. 3. The inflatable pad 204 also includes sides and ends which make that inflatable pad air-tight. Handles 206 are provided on the sides and ends of the inflatable pad 204 to facilitate the lifting and handling of that inflatable pad. In fact, those handles make it possible to use that inflatable pad as a stretcher on which persons can be transported by hand. A passage 208 is provided through the inflatable pad 204; and that passage will be located in register with the rectal area of a bed patient resting on that inflatable pad. The passage 208 will be large enough to permit body wastes to pass freely through it into a bedpan or other receptacle located below it, but will be small enough to enable the adjacent portions of the inflatable pad to provide support for the bed patient.

The numeral 210 denotes a commercially-available, low pressure, quick-disconnect fitting at one end of the inflatable pad 204; and that fitting is hermetically sealed whenever it does not have a complementary commercially-available, low pressure, quick-disconnect fitting connected to it. Such a complementary commercially-available, low pressure, quick-disconnect fitting is provided at the free end of each of the flexible hoses 222 and 226. The connecting of the complementary commercially-available, low pressure, quick-disconnect fitting, at the free end of either of those flexible hoses, to the commercially-available, low pressure, quick-disconnect fitting 210 will permit air to be introduced into or withdrawn from the inflatable pad 204.

Flexible straps 212 are secured to the inflatable pad 204, adjacent the sides of that inflatable pad; and the free ends of those straps have openings 213 therein which can telescope over the heads of the headed pins 134 on the supporting surface 120. Whenever the straps 212 have the openings 213 in the lower ends thereof telescoped over the heads of the headed pins 134, the inflatable pad 204 will be held against shifting relative to the supporting surface 120.

The numeral 214 denotes an inflatable spacer which underlies one end of the inflatable pad 204. That inflatable spacer has an upper surface, a bottom surface, a multitude of drop threads which extend between and interconnect those surfaces, sides and ends. Some of the drop threads of that inflatable spacer are shown in FIG. 3. The inflatable spacer 214 is provided with a commercially-available, low pressure, quick-disconnect fitting 218; and that fitting is hermetically sealed whenever it does not have a complementary commercially-available, low pressure, quick-disconnect fitting connected to it. Such a complementary commercially-available, low pressure, quick-disconnect fitting is provided at the free end of each of the flexible hoses 222 and 226. The connecting of the complementary commercially-available, low pressure, quick-disconnect fitting, at the free end of either of those flexible hoses, to the commercially-available, low pressure, quick-disconnect fitting 218 will permit air to be introduced into or withdrawn from the inflatable spacer 214. The numeral 216 denotes an inflatable spacer which underlies the other end of the inflatable pad 204. The inflatable spacer 216 has an upper surface, a lower surface a multitude of drop threads which extend between and interconnect those surfaces, sides and ends. In addition, the inflatable spacer 216 has a commercially-available, low pressure, quick-disconnect fitting 220; and that fitting is hermetically sealed whenever it does not have a complementary commercially-available, low pressure, quick-disconnect fitting connected to it. Such a complementary commercially-available, low pressure, quick-disconnect fitting is provided at the free end of each of the flexible hoses 222 and 226. The connecting of the complementary commercially-available, low pressure, quick-disconnect fitting, at the free end of either of those flexible hoses, to the commercially-available, low pressure, quick-disconnect fitting 220 will permit air to be introduced into or withdrawn from the inflatable spacer 216.

The inflatable pad 204 and the inflatable spacers 214 and 216 could be made of different materials, and they could be made in different ways. For examaple, that inflatable pad and those inflatable spacers could be made of dacron, nylon, fiber glass and many other filaments, single or stranded; and that inflatable pad and those inflatable spacers could be made in the same way in which the Goodyear Aerospace Corporation makes the three-dimensional structural fabrics which it sells under the mark AIRMAT.

Whenever the inflatable pad 204 and the inflatable spacers 214 and 216 are deflated, they are very flexible and pliable, and they will occupy very little space. As a result, they can underlie a bed patient without causing that bed patient any discomfort. Whenever that inflatable pad and those inflatable spacers are fully inflated, they are quite firm, and they can provide full support for a bed patient. Whenever the inflatable pad 204 is just partially inflated, it will provide a gentle, cradle-like cushioning action for the bed patient.

The inflatable pad 204 can be dimensioned to have an inflated thickness within a range of 2 to 6 inches. Similarly, each of the inflatable spacers 214 and 216 can be dimensioned to have an inflated thickness within a range of 2 to 6 inches. As a result, inflating of the inflatable pad 204 and of the inflatable spacers 214 and 216 can gently but firmly raise a bed patient a distance of from 4 to 12 inches above the level of the mattress on a bed. As the inflatable spacers 214 and 216 are inflated, they will raise the inflated pad 204 upwardly relative to that mattress; and, depending upon the inflated thicknesses of those inflatable spacers, the central portion of that inflatable pad can be raised from 2 to 6 inches from that mattress.

The inflated thickness of each of the inflatable spacers 214 and 216 is greater than the height of the bedpan 258 shown in FIG. 3. As a result, that bedpan can be freely moved into position below the passage 208 in the inflatable pad 204, and can subsequently be freely removed from position below that passage. Also, the inflated thickness of each of the inflatable spacers 214 and 216 is greater than the combined heights of the supporting surface 120 and of the carrier 112, as shown by FIG. 2. Consequently, that carrier and that supporting surface can readily be telescoped into the space between the upper surface of the mattress and the lower surface of the inflatable pad 204.

If desired, one or the other of the inflatable spacers 214 and 216 could be left in deflated condition. Where that was done, the inflatable pad 204 would incline at a gentle angle relative to the mattress of the bed; and hence, a gentle inclination of the bed patient's body, either with the head down or with the head up, could easily be attained. That inclination could be maintained as long as desired, and it could be attained and maintained without any discomfort to the bed patient. All that need be done is to inflate the inflatable pad 204, and thereafter to inflate the desired inflatable spacer 214 or 216. As that inflatable spacer was inflated, the adjacent end of the inflatable pad 204 would raise upwardly; and that inflatable pad would be so stiff that it would gently but firmly raise all portions of the bed patient's body to the desired inclination.

The flexible hose 222 has one end thereof connected to the valve 201 by piping and a T-junction 223, as shown by FIG. 1. Normally that flexible hose is held within a hose compartment 224 within the chassis 40; and normally the door of that hose compartment is closed. However, that door is readily openable to permit the flexible hose 222 to be withdrawn from that compartment, and to have the commercially-available, low pressure, quick-disconnect fitting at the free end thereof connected to the commercially-available, low pressure, quick-disconnect fitting 210 on the inflatable pad 204 or to either of the commercially-available, low pressure, quick-disconnect fittings 218 and 220 on the inflatable spacers 214 and 216. Similarly, the flexible hose 226 has one end thereof connected to the valve 201 by piping and the T-junction 223, as shown by FIG. 1. Normally that flexible hose is held within a hose compartment 228 within the chassis 40; and normally the door of that hose compartment is closed. However, that door is readily openable to permit the flexible hose 226 to be withdrawn from that compartment, and to have the commercially-available, low pressure, quick-disconnect fitting at the free end thereof connected to the commercially-available, low pressure, quick-disconnect fitting 210 on the inflatable pad 204 or to either of the commercially-available, low pressure, quick-disconnect fittings 218 and 220 on the inflatable spacers 214 and 216.

Referring particularly to FIG. 21, the numeral 230 denotes an electric plug which can be plugged into the standard and usual electric outlet in the wall of a room in a hospital or nursing home. An overload device 232 is connected between one prong of the plug 230 and a connector strip 233; and the other prong of that plug is directly connected to a connector strip 235. A lamp 234 has the terminals thereof connected to the connector strips 233 and 235, and thus will be illuminated whenever the plug 230 is plugged into the appropriate electric outlet. One terminal of the digital readout and transducer supply 236 is directly connected to the connector strip 235, while the other terminal of that digital readout and transducer supply is connected to the connector strip 233 by one pole of a double pole, double throw switch 238. A DC power distribution and charger 240 has the input terminals thereof directly connected to the connector strips 233 and 235; and hence that DC power distribution and charger will develop a DC voltage at the output thereof whenever the plug 230 is plugged into an appropriate electric outlet.

The storage battery 192 has the positive output terminal thereof directly connected to the positive output terminal of the D.C. Power Distribution And Charger 240; and it has the negative terminal thereof connected to the negative terminal of that D.C. Power Distribution And Charger by an overload device 242. A voltmeter 244 is connectable across the terminals of the storage battery 192 by a single pole, single throw switch 245. The positive output terminal of the D.C. Power Distribution And Charger 240 is connected to the two stationary contacts adjacent the other pole of the double-pole double-throw switch 238. That other pole is connected to one pole of a double-pole double-throw reversing switch 246, and also is connected to one terminal of the motor 198 by a single-pole single-throw switch 250. The other ple of the double-pole double-throw reversing switch 246 and the other terminal of the motor 198 are connected to the negative output terminal of the D.C. Power Distribution And Charger 240 by the overload device 242. The limit switch 95 selectively connects the right-hand contacts of the double-pole double-throw reversing switch 246 to the terminals of the gear motor 84; and the limit switch 97 selectively connects the left-hand contacts of that double-pole double-throw reversing switch to these terminals.

The control panel 252 has a knob which can be used to set the movable contacts of the double-pole double-throw switch 238 in their upper position, in their lower position, or in an open position. That control panel also has a knob which can be used to set the movable contacts of the double-pole double-throw reversing switch 246 in their left-hand positions, in their right-hand positions, or in an "off" position. In addition, that control panel has an actuator to selectively close the switch 250 and an actuator to selectively close the switch 245. Furthermore, that control panel has actuators that can be used to reset the overload devices 232 and 242. Moreover, the control panel 252 has a knob which can be used to set the valve 201 in its "inflate" or "deflate" position. Also, that control panel has the lamp 234 and the voltmeter 244 incorporated therein.

The numeral 254 denotes a display panel which is located on the chassis 40 in the position shown by FIG. 1. That display panel includes the digital readout of the digital readout and tranducer supply 236. That readout will display in digital form the value of any weight which rests upon the supporting surface 120, and thereby acts upon the pressure transducer 122.

To use the portable support of FIGS. 1–20, the operator will release the latches on the casters 42 of that portable support, and will then move that portable support into position where it is alongside of, and parallel with, a bed on which an inflatable pad 204, with its inflatable spacers 214 and 216, underlies a bed patient. At such time, that inflatable pad and those inflatable spacers will be in their deflated conditions. Also, at such time, the slides 108 will be fully retracted within the channels 106 on the platform 102, and the sides of the carrier 112 will be fully retracted within the slides 108; and latches, not shown, will hold that carrier in that position. Consequently, the supporting surface 120 and the carrier 112 will be directly above, and in register with, the platform 102 and the chassis 40, as shown particularly by FIG. 9.

After the chassis 40 has been moved into position wherein it is alongside of, and parallel with, the bed, the operator will set the latches on the casters 42. Also, the operator will open the hose compartment 224 and will connect the commercially-available, low pressure, quick disconnect fitting at the free end of the flexible hose 226 to the commercially-available, low pressure, quick disconnect fitting 210 of the inflatable pad 204. In addition, the operator will set the valve 201 in its inflate position, and will set the switches 238 and 250 to energize the motor 198. As air from the compressor 200 passes into the inflatable pad 204, that inflatable pad will gently but firmly raise the bed patient. The perimetral portions of that inflatable pad will become inflated before the portions which are overlain by the bed patient are inflated; and those perimetral portions will act to gently cradle the bed patient and prevent that bed patient from rolling. Very quickly, the air within the inflatable pad 204 will cause that inflatable pad to lift the bed patient and to provide a gentle but firm support for all portions of his or her body. During the inflation of the inflatable pad 204, the operator of the portable support does not have to touch the bed patient and hence the lifting of that bed patient can be accomplished without any discomfort to the bed patient. Thereafter, the motor 198 will be de-energized until the commercially-available, low pressure, quick disconnect fitting at the free end of the flexible hose 222 is disconnected from the commercially-available, low pressure, quick disconnect fitting of the inflatable pad 204 and is connected to the commercially-available, low pressure, quick disconnect fitting 218 of the inflatable spacer 214, and until the commercially-available, low pressure, quick disconnect fitting on the free end of the flexible hose 226 is connected to the commercially-available, low pressure, quick disconnect fitting 220 of the inflatable spacer 216. At such time, the motor 198 will be re-energized until both of those inflatable spacers are fully inflated. The operator does not need to touch the bed patient as those inflatable spacers are inflated; and hence the bed patient can be raised from four to twelve inches above the level of the mattress without having anyone touch him. As the inflatable spacers 214 and 216 are inflated, they will develop a space between the mattress and the undersurface of the central portion of the inflatable pad 204 which has a height greater than the distance between the bottom of the carrier 112 and the top of the supporting surface 120.

Once the inflatable pad 204 and the inflatable spacers 214 and 216 have been inflated, the operator will open switch 250, and will set the switches 238 and 246 so they energize the gear motor 84 in the raising direction. That gear motor will cause the lead screw 78 to rotate and cause the follower block 96 to move to the left in FIG. 9; and, as that follower block so moves, it will cause the pins 98 thereon to coact with the slots in the upper ends of the slotted arms 62 of the gear segment 60 to start that gear segment rotating in the counterclockwise direction in FIG. 9. As that gear segment rotates in that direction, it will rotate the pinion 72 in the clockwise direction, and thus will cause the pinion 74, the shaft 54, and the pinions 56 to rotate in the counterclockwise direction. Such rotation of those pinions will cause the racks 52 and the stabilizing legs 48 to shift to the right in FIG. 9. As the gear motor 84 continues to drive the lead screw 78, the free ends of the stabilizing legs 48 will approach the floor on which the chassis 40 is resting; and the rollers 50 of those stabilizing legs will move into firm engagement with that floor.

At such time, the gear segment 60 will be in the dotted-line position in FIG. 9; and the follower block 96 will be immediately adjacent the central portion of the slide 86. Continued rotation of the lead screw 78 by the gear motor 84 will cause the left-hand face of that follower block to engage the right-hand face of the central portion of the slide 86; and that follower block will force that slide to move out of the solid-line position toward the dotted-line position in FIG. 9. Such movement of the slide 86 will shift the slotted bosses 92 to the left, and will thereby force the levers 136 and 142 to act as a scissor jack and to raise the platform 102 upwardly. As the lower ends of the end plates of the lever 136 are shifted to the left, the upper ends of the end plates of the lever 142 will move to the left; and such movement will be permitted by the elongated slots in the slotted bosses 104 at the under surface of the platform 102. When the carrier 112 and the supporting surface 120 reach a level corresponding to the space between the mattress and the lower surface of the inflatable pad 204, the operator will open the switch 246 to de-energize the gear motor 84.

Thereupon, the operator of the portable support will release the latches, not shown, which normally hold the carrier 112 in the retracted position of FIG. 9, and will grasp the handle 130 and push that handle toward the bed patient. The force applied to the handle 130 will cause the supporting surface 120 and the carrier 112 to move relative to the slides 108; and the rollers 114 within the recesses at the sides of that carrier will facilitate such movement. Either simultanaously with the movement of the carrier 112 relative to the slides 108, or after that movement has been completed, those slides will move relative to the channels 106. The movement of the supporting surface 120 and the carrier 112 will be continued until that supporting surface and that slide are in position between the mattress and the central portion of the inflatable pad 204. The handle 130 will engage the confronting side of the inflatable pad 204, and will thereby halt further telescoping movement of the supporting surface 120 and of the carrier 112 into the space defined by the mattress and by the central portion of the inflatable pad 204. At the time the handle 130 engages the confronting side of the inflatable pad 204, the other end of the supporting surface 120 will project beyond the opposite sides of that inflatable pad. As the carrier 112 and the supporting surface 120 are moved into the fully extended position of FIG. 1, the operator will actuate latches, not shown, which will releasably hold that carrier and that supporting surface in that fully extended position.

If the bed patient is receiving blood, plasma, glucose, saline solution, or the like, a hanger 132 can be set in position within one of the sockets 131 of the supporting surface 120. Thereafter, the bottle 256 of blood, plasma, glucose, saline solution, or the like can be suspended from that hanger. This means that the bed patient can be lifted without any interruption in the ingress of necessary fluids into his or her body. If the bottle 256 was located on the opposite side of the bed, the hanger 132 would be set in one of the sockets 125 in the supporting surface 120. If any tubes extend from the body of the bed patient to containers supported by the bed or on the floor beneath the bed, those containers can be suspended from the hangers, such as the hangers 284 in FIGS. 23–25. Those hangers can be suitably supported by the sockets 125 or 131 of the supporting surface 120. This means that the bed patient can be lifted without any interruption in the egress of fluids from his or her body.

At this time, the weight of the bed patient will be borne by the mattress through the medium of the inflatable pad 204 and of the inflatable spacers 214 and 216. Consequently, no substantial rotative moment will be applied to the portable support. However, because the stabilizing legs 48 extend outwardly to the right of the chassis 40 in FIG. 2, and thus underlie the carrier 112, the supporting surface 120, and the inflatable pad 204, that protable support is capable of withstanding any rotative moments which could be applied to it by that inflatable pad and by the bed patient thereon.

To effect lifting of the bed patient, the operator need only re-close the switch 246 to re-energize the gear motor 84 in the lifting direction. The renewed rotation of the lead screw 78 will cause the follower block 96 to shift the slide 86 further toward the dotted-line position shown in FIG. 9; and, as that slide continues to move toward that dotted-line position, the levers 136 and 142 will continue to act as a scissors jack, and thus will raise the platform 102 even further. The connecting plates 137 and 143, respectively, of the levers 136 and 142 and the elongated pivot 148 stabilize the platform 102 as that platform is being lifted. If any additional stabilizing of that platform should be desired, the depending sides of that platform could coact with the structural members of the chassis 40 to provide that additional stabilizing. The platform 102 need only be raised far enough to enable the supporting surface 120 to bear the full weight of the inflatable pad 204 and of the bed patient. Because the movable element of the pressure transducer 122 does not permit the supporting surface 120 to move very far downwardly relative to the carrier 112, the platform 102 need only be lifted a short distance to enable the full weight of the inflatable pad 204 and of the bed patient to be borne by the supporting surface 120. The digital readout and transducer supply 236 will provide an immediate readout of the weight of the inflatable pad 204 and of the bed patient; and hence the weight of the bed patient can be quickly ascertained.

If the operator of the portable support of FIGS. 1–20 merely wished to weigh the bed patient, that operator would then shift the double-pole double-throw switch 246 to the lowering position. The resulting opposite rotation of the lead screw 78 would move the follower block 96 toward the right in FIG. 9, and thus would permit the weight of the supporting plate 120, of the carrier 112, of the platform 102, and of the levers 136 and 142 to shift the slide 86 toward the solid-line position in FIG. 9. At the time the supporting surface 120 had lowered the inflatable pad 204 sufficiently to enable the inflated spacers 214 and 216 to again rest upon the mattress of the bed, the switch 246 could be re-opened to de-energize the gear motor 84; and then a pull on the handle 130 could cause the slides 108 to telescope back into the channels 106 and could cause the sides of the carrier 112 to telescope back into those slides. Before that pull was applied to the handle 130, any hangers 132 which had been inserted within the sockets 125 or 131 of the supporting surface 120 would be removed, and any hangers 286 which had been secured to that supporting surface would have been removed.

Once the supporting surface 120 and the carrier 112 have been moved out from the space between the mattress and the bottom of the inflatable pad 204, the hoses 222 and 226 could be connected, respectively, to the inflatable spacers 214 and 216. Thereupon, the valve 201 could be shifted to its deflate position; and the motor 198 could be re-energized. At such time, the compressor 200 would draw air from those inflatable spacers via the hoses 222 and 226, the T-junction 223, the valve 201 and the valve 205; and it would expel that air via pressure regulator 203, the valve 201 and the silencer 199. After the inflatable spacers have been deflated, the hose 226 will be disconnected from the inflatable spacer 216, and the hose 222 will be disconnected from the inflatable spacer 214 and then connected to the inflatable pad 204. After that inflatable pad has been deflated, the hose 222 will be disconnected from that inflatable pad; and then the motor 198 can be de-energized. At this time, the hoses 222 and 226 will folded and stored, respectively, within the hose compartments 224 and 228.

The valve 205 will preferably be set to limit the pressure at the inlet of the compressor 200 to a value less than one-tenth of a pound per square inch below atmospheric pressure. Where that is done, the inflatable spacers 214 and 216 and the inflatable pad 204 will be readily flexible after they are fully deflated. If, however, a "hard" vacuum were to be developed within the inflatable spacers 214 and 216 and in the inflatable pad 204, those inflatable spacers and that inflatable pad would tend to become quite stiff.

By using the compressor 200 to deflate the inflatable spacers 214 and 216 and the inflatable pad 204, the present invention attains two important advantages. First, it provides prompt deflation of those inflatable spacers and of that inflatable pad. Second, it expels the air at a point which is displaced from the bed patient, and it tends to minimize the noise made by the expelled air.

As the rotation of the lead screw 78 in the lowering direction caused the follower block 96 to move toward its solid-line position of FIG. 9, and thus permitted the slide 86 to move toward its solid-line position in FIG. 9, that follower block caused the pins 98 carried thereby to re-enter the slots in the upper ends of the slotted arms 62 of the gear segment 60. That gear segment remained in the dotted-line position in FIG. 9 after the pins 98 had moved to the left, and out of engagement with the slotted arms of that gear segment; because the helical extension springs 68 applied forces to that gear segment which held the pins 64 on that gear segment in engagement with the stops 69 on the supporting subframe 53. The pins 64 and the stops 69 are disposed so the slots in the upper ends of the slotted arms 62 of the gear segment 60 will be in register with the pins 98 on the follower block 96 when the follower block moves from the dotted-line position toward the solid-line position in FIG. 9.

Continued rotation of the lead screw 78 in the lowering direction will cause the follower block 96 to act through the pins 98 thereon to rotate the gear segment 60 in the clockwise direction, and will thereby cause the shaft 54 and the pinions 56 thereon to rotate in the clockwise direction. That rotation will force the stabilizing legs 48 to move back into retracted position within the channels 44. Such retraction will make the overall width of the portable support of FIGS. 1–20 small enough to permit that portable support to pass freely through average-width doorways in hospitals and nursing homes.

As shown by FIG. 9, the follower block 96 is spaced an appreciable distance from the central portion of the slide 86 whenever the platform 102 is in its fully lowered position. That distance enables the follower block 96 to move far enough to act through the gear segment 60, the pinions 72 and 74 and the pinions 56 to move the stabilizing legs 48 into engagement with the floor before the slide 86 can apply lifting forces to the scissors jack constituted by the levers 136 and 142. This is important; because it enables those stabilizing legs to move into position to resist any tilting of the chassis 40 before any appreciable tilting forces are applied to that portable support. It should also be noted that the gear segment 60 will remain in the dotted-line position in FIG. 9, and hence the stabilizing legs 48 will remain solidly in engagement with the floor, until after the scissors jack, constituted by the levers 136 and 142, has permitted the platform 102 to move into its fully lowered position. This is important; because it enables those stablizing legs to remain in stablizing position until the platform 102 returns to its fully lowered position. All of this means that the stablizing legs 48 will be solidly in engagement with the floor whenever the platform 102 is out of its fully lowered position.

If an operator merely wished to use the portable support of FIGS. 1–20 to effect lifting of a bed patient to enable the bedpan 258 to be set in position beneath the passage 208 in the inflatable pad 204, the platform 102 would not have to be raised. The gear motor 84 would not have to be actuated; and hence the stabilizing legs 48 would not be moved into engagement with the floor. Instead, the hoses 222 and 226 would be appropriately connected to the inflatable spacers 214 and 216 and to the inflatable pad 204; and the motor 198 would be energized to cause successive inflation of that inflatable pad and of those inflatable spacers. Once that inflatable pad and those inflatable spacers had been fully inflated, the bedpan 258 could be set in position beneath the passage 208 which extends through the inflatable pad 204.

Because the inflatable pad 204 underlies all portions of the bed patient's body, the weight of that bed patient's body is distributed over that inflatable pad, and no part of the bed patient's body experiences uncomfortable pressures. Consequently, the bed patient can be supported comfortably in elevated position above the bedpan 258 for whatever length of time is necessary. This is in contrast to the usual situation wherein a large part of the weight of the bed patient's body is concentrated on that portion of the body which directly engages the bedpan.

Because the weight of the bed patient's body is wholly supported by the inflatable pad 204, no part of the weight of that bed patient's body need be supported by the bedpan 258. As a result, that bedpan could be made of light-weight material, and it could be made so it was readily disposable. In fact, the bedpan could be made as a thin-walled receptacle, with an air-tight cover, which had no visual resemblance to the standard and usual bedpan. By using a disposable bedpan, the unpleasant task of cleaning that bedpan can be obviated.

If an operator wishes to use the portable support of FIGS. 1–20 to transport a bed patient to another area of a room or to a different room of a hospital or nursing home, the wings 150 and 164 will be raised to, and latched in, the solid-line positions of FIG. 3. Also, the arms 156 and 160 will be rotated to, and locked in, the extended positions of FIG. 1. The openings 213 at the free ends of the straps 212 will be telescoped over the heads of the headed pins 134, and then the compressor 200 will be used to successively inflate the inflatable pad 204 and the inflatable spacers 214 and 216. Thereupon, the gear motor 84 will be energized to successively cause the stabilizing legs 48 to solidly engage the floor, and then to cause the platform 102 to rise upwardly to the level at which the supporting surface 120 and the carrier 112 can be telescoped into the space between the mattress and the under surface of the inflated pad 204. Thereafter, the gear motor 84 will be re-energized to cause the platform 102 to lift the inflatable pad 204 and the bed patient thereon above the level of any side rails or guards on the bed. At this time, a retracting pull can be applied to the handle 130 to cause the slides 108 to telescope within the channels 106 and to cause the sides of the carrier 112 to telescope within those channels. The supporting surface 120, and the inflated pad 204 with the bed patient thereon, will be above, and in register with, the chassis 40. The gear motor 84 will be energized in the lower direction to cause the platform 102 to return to the fully lowered position of FIG. 9, and to cause the stabilizing legs 48 to move to the fully retracted position of FIG. 9. Thereupon, the latches on the casters 42 can be released so the portable support can be wheeled around within the room or into other rooms.

It should be apparent from the foregoing that the portable support of FIGS. 1–20 can be used to weigh a bed patient without requiring anyone to touch that bed patient and without requiring the bed patient to move any part of his or her body. It also should be apparent that the said portable support can be used to raise that bed patient upwardly into position to use a bedpan without anyone touching that bed patient and without requiring that bed patient to move any part of his or her body. In addition, it should be apparent that the said portable support can be used to lift a bed patient out of bed and onto that portable support without anyone touching that bed patient and without requiring that bed patient to move any part of his or her body. Moreover, it should be apparent that the said portable support can be used to do all three of these things without anyone touching that bed patient and without requiring that bed patient to move any part of his or her body.

The inflatable pad 204 becomes so rigid, whenever it is fully inflated, that it can provide full support for the body of a bed patient — even when only a portion of the center of that inflatable pad is underlain and raised upwardly by the supporting surface 120. As a result, that supporting surface can coact with that inflatable pad to provide full support for a bed patient. However, if the bed patient is to be transported to different areas within a room or to different rooms within a hospital or nursing home, it will usually be desirable to provide additional stability for the inflated pad 204 by providing full support for the inflated spacers 214 and 216. To provide that full support, it is only necessary to rotate the wings 150 and 164 from the dotted-line to the solid-line positions of FIG. 3, and to rotate the arms 156 and 160 to the extended positions shown in FIG. 1. If the inflated spacer 216 rests wholly upon the chassis 40 and the wing 164, the arms 166 and 170 need not be moved to their extended positions. However, if the inflated spacer 214 rests wholly upon the chassis 40 and the wing 150, the arms 166 and 170 should be rotated to their fully extended positions to provide full support for the inflated spacer 216. At such time, the arms 156 and 160 can be retracted into position adjacent the wing 150 — to reduce the effective overall length of the chassis 40. When the portable support of FIGS. 1–20 is to be used to transport a bed patient to different areas within a room or to different rooms within a hospital or nursing home, it will usually be desirable to completely deflate the inflatable spacers 214 and 216 and then to partially deflate the inflated pad 204. That partial deflation should leave enough air in the inflatable pad 204 to enable that inflatable pad to gently cradle the bed patient, and also to hold the openings 213 at the free ends of the straps 212 in engagement with the headed pins 134. Where such partial deflation is provided, the bed patient will safely rest in comfort atop the portable support of FIGS. 1–20.

If the inflatable pad 204 is deflated to the extent that an end thereof tends to sag downwardly between the arms 156 and 160 or to sag downwardly between the arms 166 and 170, additional support will be provided for that end. That additional support could be provided by sturdy straps connected to, and stretched tightly between, those arms.

Referring particularly to FIG. 22, the numeral 260 generally denotes the chassis of a second preferred embodiment of portable support that is made in accordance with the principles and teachings of the present invention; and that portable support can be made very similar to the portable support of FIGS. 1–20. Specifically, the portable support 260 can have casters 42, channels 44, stabilizing legs 48, a shaft 54, pinions 56, a gear segment 60, pinions 72 and 74, a lead screw 78, a slide 86, a follower block 96, a platform 102, channels 106, slides 108, a carrier 112, a supporting surface 120, a pressure transducer 122, a handle 130, and wings 150 and 164. In addition, the portable support of FIG. 22 will have a motor 198, a compressor 200, an air valve 201, and flexible hoses 222 and 226. However, the portable support of FIG. 22 will not have the gear motor 84 of the portable support of FIGS. 1–20; and, instead, the former portable support will have a flexible shaft 262 connected to the lead screw 78, and will have a handle 264 connected to the rotatable element of that flexible shaft. The handle 264 is located at the exterior of the chassis 260; and it can easily be operated by the person in the hospital or nursing home who operates the portable support of FIG. 22. Because it does not have the gear motor 84 of the portable support of FIGS. 1–20, the portable support of FIG. 22 can have a simpler control panel 252 and a simpler electric circuit.

The operation and use of the portable support of FIG. 22 will be identical to those of the portable support of FIGS. 1–20, except for the fact that the crank 264 must be rotated to cause the stabilizing legs 48 to move outwardly and contact the floor and then to cause raising of the platform 102, of the carrier 112 and of the supporting surface 120. Conversely, the crank 264 must be operated to lower the platform 102, the carrier 112 and the supporting surface 120, and then to effect retraction of the stabilizing legs 48 within the channels 44. Because the portable support of FIG. 22 does not have the gear motor 84 of the portable support of FIGS. 1–20, it is less expensive than the latter portable support.

Figures 25, 26:
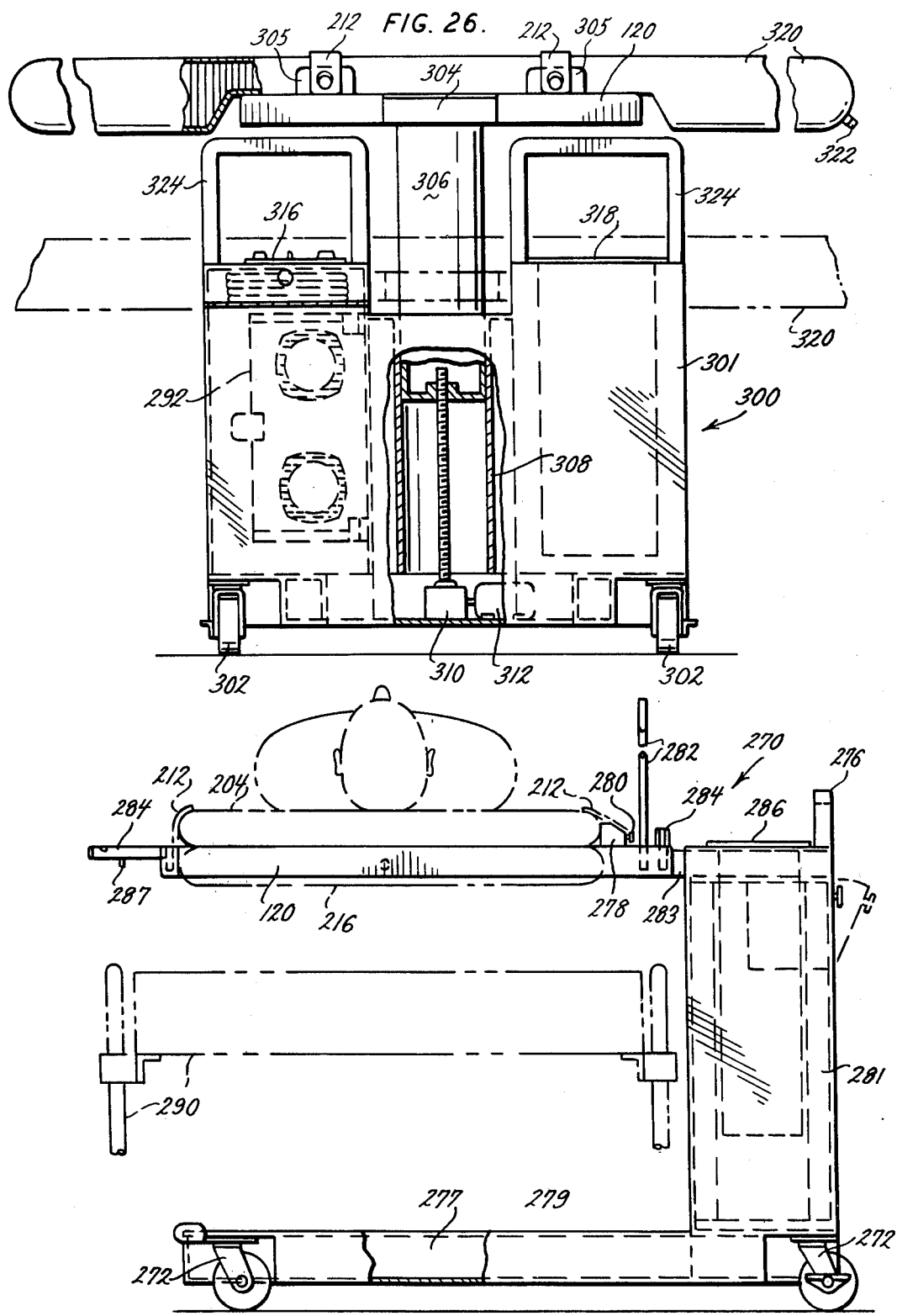
FIG. 25 is a partially broken-away, partially-sectioned, elevational view of the left-hand end of the portable support of FIG. 23.
FIG. 26 is a partially broken-away, partially-sectioned elevational view of a fourth preferred embodiment of portable support.

Referring particularly to FIGS. 23–25, the numeral 270 generally denotes the chassis of a third preferred embodiment of portable support that is made in accordance with the principles and teachings of the present invention. That portable support has a base which includes two elongated tubular beams 274 and 275; and FIG. 24 shows those elongated tubular beams as being rectangular in cross section. The space between those elongated tubular beams is enclosed by a bottom plate, a top plate 279, and sides to define a space 277 in which the deflated pad 204 and the attached deflated spacers 214 and 216 can be stored whenever they are not in use. As shown particularly by FIG. 23, the top plate 279 extends outwardly beyond the sides of the beams 274 and 275. Casters 272 of standard and usual design are secured to the lower surface of the top plate 279 adjacent the sides of the beams 274 and 275 to enable the portable support of FIGS. 23–25 to be moved around within a room or between rooms in a hospital or nursing home.

The portable support of FIGS. 23–25 includes an upright portion 281 which is rigidly secured to the beams 274 and 275 of the base. Beams 283 extend forwardly from the upper part of the upright portion 281 to underlie and support a carrier, no shown, which can be essentially similar to the carrier 112 of the portable support of FIGS. 1–20. However, the beams 283 will hold the carrier fixedly spaced in position ahead of the upright portion 281. Hingedly secured to that carrier is a supporting surface 120 which can be essentially identical to the supporting surface 120 of the portable support of FIGS. 1–20. A handle 276 is secured to the upright portion 281 of the portable support of FIGS. 23–25; and that handle can be used to move that portable support within a room or between rooms of a hospital or nursing home. A diaphragm pump and electric motor therefor are denoted by the numeral 292, and the are used in lieu of the compressor 200 and the motor 198 of the portable support of FIGS. 1–22.

Stops 278 are provided on the upper face of the supporting surface 120; and those stops will engage the sides of an inflatable pad 204 whenever the carrier and the supporting surface 120 of the portable support of FIGS. 23–25 have been fully telescoped into the space between the upper surface of a mattress and the lower surface of the central area of that inflatable pad. Headed pins 280 are secured to the front edge of the supporting surface 120, and also to the rear faces of the stops 278. Those headed pins caan accommodate the openings 213 in the free ends of the straps 212 of the inflatable pad 204. As shown particularly by FIGS. 23–25, hangers 284 can be pivotally secured to the supporting surface 120 at any of the four corners of that supporting surface. Those hangers can support containers into which fluids can drain from hoses attached to the bed patient. When the hangers 284 are not being used, they can be rotated into positions parallel to the front or rear edges of the supporting surface 120. Sockets 285 adjacent the rear edge of that supporting surface can receive projections 287 on the lower surfaces of the hangers 284 to hold those hangers parallel to that rear edge. Also, as indicated by FIGS. 24 and 25, upwardly-directed hangers 282 can be set in sockets 289 in the supporting surface 120; and those hangers can be used to support bottles of blood, plasma, glucose, saline solution, or the like.

Because the carrier of the portable support of FIGS. 23–25 is fixedly spaced in position ahead of the upright portion 281, that portable support does not utilize a lead screw 78, a slide 86, a platform 102, channels 106, slides 108, levers 136 and 142, or a gear motor 84. Because that portable support has the base thereof underlying the carrier thereof — to prevent tilting of that portable support — that portable support does not require a gear segment 60, pinions 56, 72 and 74, channels 44, and stabilizing legs 48. As a result, the portable support of FIGS. 23–25 is less expensive than the portable support of FIGS. 1–20.

The portable support of FIGS. 23–25 has a display panel 286 and a control panel 288. The display panel 286 has a digital readout which is part of a digital readout and transducer supply that is comparable to the digital readout and transducer supply 236 of FIG. 21. A pressure transducer, not shown, which can be identical to the pressure transducer 122 of FIGS. 9 and 21 will be interposed between the supporting surface 120 and the carrier, not shown, of the portable support of FIGS. 23–25. That pressure transducer will respond to the combined weight of the supporting surface 120, of the inflatable pad 204, of the inflatable spacers 214 and 216, of the bed patient, and of the bed patient's clothing to develop a signal which corresponds to that combined weight. Because the portable support of FIGS. 23–25 does not use the gear motor of the portable support of FIGS. 1–20, the control panel 288 can be simpler than the control panel 252 of the latter portable support.

The portable support of FIGS. 23–25 is intended for use with a bed 290 which can elevate or lower the springs and the mattress thereof. In using that portable support, an inflatable pad 204 with its attached inflatable spacers 214 and 216 will be placed atop that mattress and beneath a bed patient; and then that inflatable pad will be secured to the supporting surface 120 by connecting the straps 112 to the pins 280 on the stops 278 and on that supporting surface. The inflatable pad 204 and the inflatable spacers 214 and 216 will be inflated by appropriate actuation of valve 201 and of the diaphragm pump and electric motor 292. Thereafter, the bed 290 will be actuated to move the top of the mattress to the approximate level of the bottom of the carrier, not shown, of that portable support. Thereupon, the handle 276 will be gripped, and a force will be applied to it, to cause the portable support to move forwardly toward the bed 290 until the carrier and the supporting surface 120 have moved into position below the central portion of the inflated pad 204.

At this time, the bed 290 will be actuated to lower the mattress downwardly out of engagement with the inflated spacers 214 and 216. As that mattress is moved downwardly, the combined weight of the bed patient, of the inflated pad 204, of the inflated spacers 214 and 216, and of the clothing of the bed patient will be borne by the supporting surface 120. The pressure transducer 122 of the portable support of FIGS. 23–25 will respond to that combined weight to cause the digital readout and transducer supply 236 of that portable support to display a digital value corresponding to that combined weight. Subsequently, the bed 290 will be actuated to raise the mattress upwardly to engage and raise the inflated spacers 214 and 216; and, at such time, the portable support of FIGS. 23–25 can be moved a short distance away from that bed; and the valve 201 and the diaphragm pump and electric motor 292 can be used to deflate the inflated spacers 214 and 216 and then deflate the inflated pad 204.

If the portable support of FIGS. 23–25 is to be used to enable the bed patient to use a bedpan, that portable support will be moved close to the bed 290, and the valve 201 and the diaphragm pump and electric motor 292 will be used to successively inflate the inflatable pad 204 and the inflatable spacers 214 and 216. Once that inflatable pad and those inflatable spacers have been inflated, the bed patient will have been raised above the surface of the mattress of the bed 290, and the bedpan can be inserted in appropriate position beneath the passage 208 through that inflated pad. Thereafter the two portions of a split sheet can be moved apart to expose the upper portion of the opening 208.

If the portable support of FIGS. 23–25 is to be used to transport a bed patient within a given room or space, the inflatable pad 204 and the inflatable spacers 214 and 216 will be inflated, and then that portable support will have the carrier and the supporting surface 120 thereof telescoped into the space beneath the central portion of that inflated pad. Thereafter, the bed 290 will be actuated to lower the mattress thereof downwardly and away from the inflated spacers 214 and 216. At such time, the bed patient and the inflated pad 204 will be wholly supported by the supporting surface 120 of that portable support; and then the latches on the casters 272 can be released to permit that portable support to be moved around within that given room or space. Although the portable support of FIGS. 23–25 can pass through average-width doorways of hospitals and nursing homes, that portable support will be unable to do so when it is holding the inflated pad 204. However, that portable support can be freely moved around within a given room or space within a hospital or nursing home.

Referring particularly to FIGS. 26 and 27, the numeral 300 denotes the chassis of a fourth preferred embodiment of portable support that is made in accordance with the principles and teachings of the present invention. That portable support has a base which can be identical to the base of the portable support of FIGS. 23–25, and it has an upright portion 301 which is generally similar to that of the portable support of FIGS. 23–25. Casters 302 are provided adjacent the four corners of the base of the chassis 300; and, when the latches on those casters are released, the portable support of FIGS. 26 and 27 can be moved freely within a given room or space in a hospital or nursing home, or between rooms or spaces within such hospital or nursing home.

The portable support of FIGS. 26 and 27 differs from the portable support of FIGS. 23–25 in that the supporting surface of the latter portable support can not be moved upwardly or downwardly. Specifically, the supporting surface 120 of the portable support of FIGS. 26 and 27 is hinged to a carrier 304 which is fixedly secured to the upper end of a plunger 306. That plunger can be driven upwardly and downwardly relative to a cylinder 308 by the lead screw of a screw jack; and that lead screw is connected to a motor 312 by a gear box 310. Actuation of the motor 312 in the raising direction will cause the lead screw to drive the plunger 306, and hence the carrier 304 and the supporting surface 120, upwardly. Conversely, actuation of that motor in the lowering direction will cause the lead screw to lower the plunger 306, and hence the carrier 304 and the supporting surface 120.

Stops 305 are provided atop the supporting surface 120; and those stops can be essentially identical to the stops 278 of the portable support of FIGS. 23–25. Headed pins on those stops and headed pins, not shown, on the front end of the supporting surface 120 can releasably receive the straps 212 of an inflated pad 320 shown in FIG. 26. The inflated pad 320 differs from the inflated pad 204 in that it is formed to have inflatable spacers integral with it rather than attached to it. The inflatable pad 320 has a commercially available, low pressure, quick disconnect fitting 322 through which air can be introduced into, or through which air can be withdrawn from, the inflatable pad 320.

Hangers 314 can be pivoted to the supporting surface 120, as indicated particularly by FIGS. 27; and those hangers can be identical to the hangers 284 in FIGS. 23–25. The supporting surface 120 has sockets 315 adjacent the rear edge thereof to receive and hold projections on the lower edge of the hangers 314. Also, the supporting surface 120 has sockets 317 therein into which hangers, such as the hangers 282 of FIGS. 24 and 25, can be inserted.

A control panel 316 is provided at one side of the top of the vertical portion 301 of the chassis 300; and a display panel 318 is provided adjacent the other side of the top of that vertical section. The control panel 316 can be comparable to the control panel 252 of FIG. 3; because, although the portable support of FIGS. 26 and 27 does not have the stabilizing legs 48 of the portable support of FIGS. 1–20, it does have the motor 312 which requires the same switches and knobs that are required by the gear motor 84 of the portable support of FIGS. 1–20. The display panel 318 will include a digital readout; and that digital readout can be identical to the digital readout of the digital readout and transducer supply 236 of FIG. 21. That digital readout and transducer supply will connected to a pressure transducer which is located between the supporting surface 120 and the carrier 304.

The portable support of FIGS. 26 and 27 has handles 324 secured to the vertical portion 301 of the chassis 300 thereof. Those handles permit that portable support to be moved around within a room or space in a hospital or nursing home or to be moved between rooms or spaces in that hospital or nursing home. As shown by FIG. 26, those handles are U-shaped but are inverted, and they extend upwardly from the vertical portion 301 of the chassis 300.

The portable support of FIGS. 26 and 27 can be used in somewhat the same manner in which the portable support of FIGS. 23–25 can be used. However, instead of requiring the bed to be raised or elevated to place the carrier 304 and the supporting surface 120 in register with the space between the mattress and the bottom of the central portion of the inflatable pad 320, the portable support of FIGS. 26 and 27 can move that carrier and that supporting surface vertically into register with that space. Thereafter that portable support can be moved toward the bed to telescope that carrier and supporting surface into that space. That portable support can subsequently lift the inflatable pad 320 and the bed patient thereon; and the base of that portable support will underlie the carrier 304 and fully prevent any tilting of that portable support.

The pneumatic system shown in FIG. 28 is very useful in locations where air is an acceptable fluid for pneumatic systems. In the event any of the portable supports of the present invention were to be used in a location where air was not an acceptable fluid for pneumatic systems, a tank of helium, nitrogen, carbon dioxide or other essentially inert and non-toxic gas could be connected to the port of valve 201 to which the air filter 199 is normally connected. Where that was done, and where the movable element of that valve was in the position shown by FIG. 28, operation of the motor 198 would inflate the inflatable pad 204 and the inflatable spacers 214 and 216 with the gas from that tank. Subsequently, when that inflatable pad and those inflatable spacers were to be deflated, that tank would be disconnected from that port, and the air cleaner 199 would be re-connected to that port. Thereafter, the movable element of the valve 201 would be rotated 90° in the clockwise direction in FIG. 28, and then the motor 198 would be energized.

Where any of the portable supports of FIGS. 1–20, 22, 23–25 and 26 and 27 is used to determine the relative weight of a bed patient, the readings obtained from the digital readout of the digital readout and transducer supply 236 can be used directly. However, where that portable support is used to determine the net weight of a bed patient, the sum of the weights of the supporting surface 120, of the bed patient's attire, of the inflatable pad, of any sheets or blankets, of any hangers and bottles — including the contents thereof and any hoses attached thereto, and of any hangers and receptacles — including the contents thereof and any hoses attached thereto, must be deducted from the reading obtained from that digital readout. In either case, the pressure transducer 122 and the ditigal readout provide repeatable values that are accurate within small fractions of a pound.

The provision of the arms 166 and 170 in addition to the arms 156 and 160 enables the portable support of FIGS. 1–22 to be moved into engagement with either side of the bed on which the bed patient is resting. Similarly, the provision of the sockets 125 in addition to the sockets 131 enables that portable support to be moved into engagement with either side of that bed. As a result, that portable support can be moved into position adjacent the side of a bed with a minimum amount of maneuvering.

When the inflatable pad 204 is used to raise a bed patient, the inflatable spacers 214 and 216 will preferably be inflated simultaneously. Similarly, when that inflatable pad is used to lower a bed patient, the inflatable spacers 214 and 216 will preferably be deflated simultaneously. Simultaneous inflation or deflation of those inflatable spacers is easily attained by connecting one of the flexible hoses 222 and 226 to one of those inflatable spacers and by connecting the other of those flexible hoses to the other of those inflatable spacers.

If desired, an internal passage could be provided between the inflatable pad 204 and the inflatable spacer 214; and, similarly, an internal passage could be provided between that inflatable pad and the inflatable spacer 216. Such internal passages would enable the inflatable pad 204 and the inflatable spacers 214 and 216 to become inflated or deflated substantially simultaneously. In all cases where the inflatable spacers 214 and 216 are effectively isolated from the inflatable pad 204, that inflatable pad will be inflated before either of those inflatable spacers is inflated, but that inflatable pad will be deflated after both of those inflatable spacers have been deflated.

Where the inflatable pad 204 is used to raise a bed patient so a bedpan, such as the bedpan 258 in FIG. 3, can be moved laterally into position beneath the opening 208 of that inflatable pad, it is necessary to use a split sheet atop that inflatable pad or to roll the sheet out of register with the opening 208. In any instances where it would be undesirable to use a split sheet atop the inflatable pad 204 or would be undesirable to roll the sheet out of register with the opening 208, the sheet can be loosened sufficiently to permit it to be pressed downwardly through the opening 208, as shown particularly by FIG. 30. Specifically, a sheet 342 can have the central portion thereof loosend sufficiently to enable that central portion to be pressed downwardly through the opening 208 of the inflatable pad 204 and to be pressed into engagement with the mattress which underlies the inflatable spacers 214 and 216 of that inflatable pad.

Thereafter, a disposable bedpan 330 can be set in position within the upper part of the opening 208, as shown by FIG. 30. That disposable bedpan has a semi-rigid frame 332 which is equipped with a splash shield 334 at one end thereof. When that disposable bedpan is to be used, that splash shield will be moved upwardly into the solid-line position of FIG. 29 so it can perform its intended function. However, when the disposable bedpan 330 is to be stacked with similar disposable bedpans, during shipment and storage, that splash shield will be moved downwardly in the dotted-line position of FIG. 29. The disposable bedpan 330 has a flexible bottom 336 with an opening at the approximate center thereof; and a specimen collector 338 has the neck-like upper portion thereof connected to that opening in liquid-tight manner. The jucntion 340 between the neck of the specimen collector 338 and the flexible bottom 336 is made strong enough to prevent accidental separation of that specimen collector from that flexible bottom; but that junction is made weak enough so it can be torn by the application of a firm pull to the neck-like upper portion of that specimen collector. The specimen collector 338 is flexible; and that specimen collector and the flexible bottom 336 will readily fold when the disposable bedpan 330 is to be stacked with similar disposable bedpans.

In using the disposable bedpan 330, the central portion of the sheet 342 will be loosened sufficiently to enable that central portion to be passed downwardly into the opening 208 in the inflatable pad 204. Thereafter, the disposable bedpan 330 will have the specimen collector 338 and the flexible bottom 336 thereof moved downwardly into the space defined by the central portion of the sheet 342; and that specimen collector can be set in the position shown by FIG. 30. At such time, the semi-rigid frame 332 of that disposable bedpan will be caused to rest on those portions of the inflatable pad 204 which define the upper edge of the opening 208. The semi-rigid frame 332 is made so it will substantially fill the upper part of the opening 208 in the inflatable pad 204, and so it will receive full support from those portions of the inflatable pad 204 which define that opening.

Any waste matter from the bed patient will be collected and held by the flexible bottom 336 of the disposable bedpan 330. When the need for that disposable bedpan has ended, that disposable bedpan will be lifted upwardly out of the space within the opening 208; and, thereupon, that waste matter will pass downwardly into and be held by the specimen collector 338. The upper end of that specimen collector will then be suitably sealed — as by a clip, a short length of twine or otherwise; and a firm pull on the neck-like upper portion of that specimen collector will cause the junction 340 to tear. Thereafter, that specimen collector can be sent to a laboratory for testing of the waste matter therein, or that specimen collector and its contents can be placed in a suitable waste-disposal mechanism. The rest of the disposable bedpan 330 will be disposed in a container for dirty used objects. The sheet 342 will then be tightened; so the portion thereof which was disposed within the opening 208 will lie in taut condition above, and adjacent to, that opening.

To use the disposable bedpan 330, the legs of the bed patient must be moved sufficiently to free the central portion of the sheet 342 and to permit the insertion of that bedpan into the upper portion of the opening 208. Subsequently, the legs of the user must again be moved to permit removal of that bedpan from the upper portion of the opening 208, and to permit smoothing out of the sheet 342. However, the amount of movement which must be imparted to the legs of the bed patient can be quite limited; and hence that movement need not impose any strain on the bed patient. Moreover, any strain which might be imposed on the bed patient would be smaller than the strain which would be involved in rolling the sheet out from under the bed patient.

By using the disposable bedpan 330, it is possible to free the personnel of a hospital or nursing home from the unpleasant job of cleaning bedpans. Moreover, by using a specimen collector 338 with a relatively small neck-like upper portion, it is possible to reduce the volume of unpleasant odors which otherwise would tend to permeate the air. In addition, by making the specimen collector 338 readily detachable from the flexible bottom 336 of the disposable bedpan 330, the present invention facilitates the collecting and holding of specimens of waste material.

In any instances where the inflated thickness of the inflatable pad 204 is great enough to permit the flexible bottom 336 to be fully opened, the inflatable spacers 214 and 216 need not be inflated. However, in most instances, it will be desirable to inflate both of those inflatable spacers — thereby providing enough room in the flexible bottom 336 to open fully, and thus be able to receive and hold all waste products which it receives from the bed patient.

Whereas the drawing and accompanying description have shown and described several preferred embodiments of the present invention, it should be apparent to those skilled in the art that various changes can be made in the form of the invention without affecting the scope thereof.

What we claim is:

1. A portable support which can be used to carry a pad with a bed patient thereon and which comprises a wheel-equipped chassis, a supporting surface which normally overlies and is in register with said wheel-equipped chassis, said supporting surface having a length shorter than said pad and being dimensioned to be moved into position wherein it is disposed beneath said pad and hence is disposed beneath said patient, and cantilever-type guiding and supporting means which are mounted on said wheel-equipped chassis and which guide and support said supporting surface while permitting said supporting surface to be moved laterally away from said wheel-equipped chassis and into a cantilever-like position wherein it is disposed beneath said pad with said bed patient thereon, said wheel-equipped chassis and said cantilever-type guiding and supporting means enabling said supporting surface to underlie and thereby hold and support said pad with said bed patient thereon when said supporting surface is in said cantilever-like position, said cantilever-type guiding and supporting means also guiding and supporting said supporting surface as said supporting surface is moved laterally toward said wheel-equipped chassis to move said pad with said bed patient thereon above and into register with said wheel-equipped chassis.

2. A portable support as claimed in claim 1 wherein said cantilever-type guiding and supporting means confine said supporting surface for horizontal movement as said supporting surface is moved laterally away from and toward said wheel-equipped chassis, wherein said cantilever-type guiding and supporting means include a hollow elongated element and a second elongated element which is disposed, at least in part, within said hollow elongated element, wherein said hollow elongated element is mounted on said wheel-equipped chassis and is at least as strong structurally as said second elongated element, and wherein said cantilever-type guiding and supporting means holds said supporting surface substantially horizontal at all times.

3. A portable support as claimed in claim 1 wherein said cantilever-type guiding and supporting means include elongated channels which confine and guide horizontally-movable elements, wherein said elongated channels are mounted on said wheel-equipped chassis and are at least as strong structurally as said horizontally-movable elements, and wherein anti-friction bearings permit ready movement of said horizontally-movable elements relative to said elongated channels.

4. A portable support as claimed in claim 1 wherein said pad is an inflatable pad that can be deflated to be flexible but that can be inflated to be stiff enough to hold and support said bed patient thereon even though said supporting surface underlies only a small fraction of the overall area of said pad, and wherein said supporting surface can hold and support said pad and said bed patient thereon while moving said pad and said bed patient thereon from a position above said bed to a position above said wheel-equipped chassis and vice-versa.

5. A portable support which can be used to carry a pad with a bed patient thereon and which comprises a wheel-equipped chassis, a supporting surface which normally overlies and is in register with said wheel-equipped chassis, and cantilever-type guiding and supporting means which guide and support said supporting surface while permitting said supporting surface to be moved laterally away from said wheel-equipped chassis and into a cantilever-like position wherein it is disposed beneath said pad with said bed patient thereon, said cantilever-type guiding and supporting means enabling said supporting surface to hold and support said pad with said bed patient thereon when said supporting surface is in said cantilever-like position, said cantilever-type guiding and supporting means also guiding and supporting said supporting surface as said supporting surface is moved laterally toward said wheel-equipped chassis to move said pad with said bed patient thereon above and into register with said wheel-equipped chassis, said pad being an inflatable pad, said inflatable pad being inflatable to a state of rigidity which will enable said supporting surface to hold and support said bed patient even though said supporting surface underlies only a small fraction of the overall area of said inflatable pad, said inflatable pad being inflatable to raise said bed patient relative to said bed, said inflatable pad defining a recess whenever it is inflated that is large enough to accommodate said supporting surface, and said supporting surface holding and supporting said inflatable pad and said bed patient thereon while moving said inflatable pad and said bed patient thereon from a position above said bed to a position above said wheel-equipped chassis and vice-versa.

6. A portable support as claimed in claim 1 wherein lifting means can moved said supporting surface vertically relative to said wheel-equipped chassis to raise and lower said pad and said bed patient thereon relative to said bed, and wherein manually-operable cantilever-type guiding and supporting surfaces provide selective lateral movement of said supporting surface and of said pad and of said bed patient thereon from a position above said bed to a position above said wheel-equipped chassis and vice-versa.

7. A portable support as claimed in claim 1 wherein a motor is mounted on and movable with said wheel-equipped chassis, wherein said stabilizing legs are movable into engagement with the floor in response to actuation of said motor to stabilize said wheel-equipped chassis, and wherein an interlocking means requires said motor to move said stabilizing legs into engagement with said floor before said supporting surface can assume and hold the weight of said pad and of said bed patient thereon, said supporting surface being adapted to move said pad and said bed patient thereon from a position above said bed to a position above said wheel-equipped chassis and vice-versa while said stabilizing legs are in engagement with said floor.

8. A portable support which can be used to carry a pad with a bed patient thereon and which comprises a wheel-equipped chassis, a supporting surface which normally overlies and is in register with said wheel-equipped chassis, said supporting surface having a length shorter than said pad and being dimensioned to be moved into position wherein it is disposed beneath said pad and hence is disposed beneath said patient, cantilever-type guiding and supporting means which are mounted on said wheel-equipped chassis and which guide and support said supporting surface while permitting said supporting surface to be moved laterally away from said wheel-equipped chassis and into a cantilever-like position wherein it is disposed beneath said pad with said bed patient thereon, said wheel-equipped chassis and said cantilever-type guiding and supporting means enabling said supporting surface to underlie and thereby hold and support said pad with said bed patient thereon when said supporting surface is in said cantilever-like position, said cantilever-type guiding and supporting means also guiding and supporting said supporting surface as said supporting surface is moved laterally toward said wheel-equipped chassis to move said pad with said bed patient thereon above and into register with said wheel-equipped chassis, said wheel-equipped chassis being shorter than the height of a person of average height, a wing rotatably secured to said wheel-equipped chassis, said wing being movable downwardly from an essentially-horizontal position to an essentially-vertical position to make the total effective horizontal dimension of said wheel-equipped chassis and of said wing just slightly larger than the overall total effective horizontal dimension of said wheel-equipped chassis, and said wing being movable upwardly to said essentially-horizontal position to make the total effective horizontal dimension of said wheel-equipped chassis and of said wing substantially larger than said overall total effective horizontal dimension of said wheel-equipped chassis, said wing being dimensioned so no part thereof can reach the ground when said wing is moved downwardly from said essentially-horizontal position to said essentially-vertical position.

9. A portable support which can be used to carry a pad with a bed patient thereon and which comprises a wheel-equipped chassis, a supporting surface which normally overlies and is in register with said wheel-equipped chassis, cantilever-type guiding and supporting means which guide and support said supporting surface while permitting said supporting surface to be moved laterally away from said wheel-equipped chassis and into a cantilever-like position wherein it is disposed beneath said pad with said bed patient thereon, said cantilever-type guiding and supporting means enabling said supporting surface to underlie and thereby hold and support said pad with said bed patient thereon when said supporting surface is in said cantilever-like position, said cantilever-type guiding and supporting means also guiding and supporting said supporting surface as said supporting surface is moved laterally toward said wheel-equipped chassis to move said pad with said bed patient thereon above and into register with said wheel-equipped chassis, said wheel-equipped chassis being shorter than the height of a person of average height, a wing rotatably secured to said wheel-equipped chassis, said wing being movable downwardly from an essentially-horizontal position to an essentially-vertical position to make the total effective horizontal dimension of said wheel-equipped chassis and of said wing just slightly larger than the overall total effective horizontal dimension of said wheel-equipped chassis, said wing being movable upwardly to said essentially-horizontal position to make the total effective horizontal dimension of said wheel-equipped chassis and of said wing substantially larger than said overall total effective horizontal dimension of said wheel-equipped chassis, said wing having an arm which is movable to retracted position relative to said wing whenever said wing is in said essentially-horizontal position to keep the total effective horizontal dimension of said wheel-equipped chassis and of said essentially-horizontal wing just slightly larger than the overall total effective horizontal dimension of said wheel-equipped chassis plus said essentially-horizontal wing, and said arm being movable to extended position relative to said wing whenever said wing is in said essentially-horizontal position to make the total effective horizontal dimension of said wheel-equipped chassis and of said essentially-horizontal wing and of said arm substantially larger than said overall total effective horizontal dimension of said wheel-equipped chassis and of said essentially-horizontal wing, said arm being selectively movable to said retracted position or to said extended position to enable said wheel-equipped chassis to support differing lengths of said pad intermediate said supporting surface and the adjacent end of said pad.

10. A portable support which can be used to carry a bed patient and which comprises a wheel-equipped chassis, a supporting surface which normally overlies and is in register with said wheel-equipped chassis, guiding and supporting means which guide and support said supporting surface while permitting said supporting surface to be moved laterally away from said wheel-equipped chassis and into position beneath said bed patient, said guiding and supporting means also guiding and supporting said supporting surface as said supporting surface is moved laterally toward said wheel-equipped chassis to move said bed patient above and into register with said wheel-equipped chassis, stablizing legs that are movable into engagement with the floor to stabilize said portable support, a motor which is mounted on and movable with said wheel-equipped chassis and which can be energized to drive the ends of said stabilizing legs into direct and enforced engagement with said floor at points which are displaced laterally from said wheel-equipped chassis, and said stabilizing legs responding to energization of said motor to directly and enforcedly engage said floor at a point below said supporting surface and thereby enable said wheel-equipped chassis to solidly support said supporting surface even when said supporting surface has been moved laterally away from said wheel-equipped chassis and into position beneath said bed patient.

11. A portable support as claimed in claim 10 wherein said stabilizing legs move angularly outwardly and downwardly from said wheel-equipped chassis as they move into engagement with said floor to stablilize said portable support, and wherein said stabilizing legs are moved by a driving means which includes a gear train and which is driven by said motor.

12. A portable support as claimed in claim 10 wherein lifting means can raise and lower said supporting surface relative to said wheel-equipped chassis and can thereby raise and lower said bed patient relative to said wheel-equipped chassis, wherein further means move said stabilizing legs into engagement with said floor, and wherein an interlock means forces said further means to move said stabilizing legs into engagement with said floor before said lifting means can raise said supporting surface.

13. A portable support as claimed in claim 10 wherein lifting means can raise and lower said supporting surface relative to said wheel-equipped chassis and can thereby raise and lower said bed patient relative to said wheel-equipped chassis, wherein further means move said stabilizing legs into engagement with said floor, wherein an interlock means forces said further means to move said stabilizing legs into engagement with said floor before said lifting means can raise said supporting surface, and wherein said interlocking means includes a lost-motion connection associated with said lifting mechanism.

14. A portable support which can be used to carry a bed patient and which comprises a wheel-equipped chassis, a supporting surface which normally overlies and is in register with said wheel-equipped chassis, guiding and supporting means which guide and support said supporting surface while permitting said supporting surface to be moved laterally away from said wheel-equipped chassis and into position beneath said bed patient, said guiding and supporting means also guiding and supporting said supporting surface as said supporting surface is moved laterally toward said wheel-equipped chassis to move said bed patient above and into register with said wheel-equipped chassis, stabilizing legs that are movable into engagement with the floor to stabilize said portable support, said stabilizing legs being engageable with said floor at a point below said supporting surface when said supporting surface has been moved laterally away from said wheel-equipped chassis and into position beneath said bed patient, lifting means that can raise and lower said supporting surface relative to said wheel-equipped chassis and that can thereby raise and lower said bed patient relative to said wheel-equipped chassis, further means that can move said stabilizing legs into engagement with said floor before said lifting means raises said supporting surface, and said further means including a driving member, elongated racks, pinions to drive said elongated racks, and a lost-motion connection between said driving member and said pinions.

* * * * *